(12) United States Patent
Inoue et al.

(10) Patent No.: US 7,920,331 B2
(45) Date of Patent: Apr. 5, 2011

(54) ANAMORPHIC CONVERTER AND IMAGE PROJECTION SYSTEM

(75) Inventors: Kazuhiko Inoue, Sakai (JP); Yasumasa Sawai, Yamatotakada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 86 days.

(21) Appl. No.: 12/473,753

(22) Filed: May 28, 2009

(65) Prior Publication Data

US 2009/0303607 A1    Dec. 10, 2009

(30) Foreign Application Priority Data

Jun. 10, 2008   (JP) ................... 2008-152054

(51) Int. Cl.
    *G02B 13/08*   (2006.01)
(52) U.S. Cl. ....................................... 359/668
(58) Field of Classification Search ............ 359/668, 359/670, 708
    See application file for complete search history.

(56) References Cited

U.S. PATENT DOCUMENTS

| | | | |
|---|---|---|---|
| 5,930,050 A | 7/1999 | Dewald | 359/670 |
| 6,512,636 B2 * | 1/2003 | Schauss | 359/668 |
| 6,678,095 B2 | 1/2004 | Kelly | 359/669 |

* cited by examiner

*Primary Examiner* — Joseph Martinez
(74) *Attorney, Agent, or Firm* — Sidley Austin LLP

(57) ABSTRACT

An anamorphic converter includes, from a projected-surface side, a first group and a second group. The first group includes one or more lens elements and has a negative power at least in a main magnification direction. The second group includes one or more lens elements and has a positive power at least in the main magnification direction. Of optical surfaces, a last surface of the first group and a first surface of the second group: [1] have a power in both main magnification and sub-magnification directions; [2] are convex toward the projected-surface side in both main magnification and sub-magnification directions in a region having an area that is ¼ or more of an optical effective region area including a center portion of each of the last and first optical surfaces; and [3] at least one of the last and first optical surfaces is a free curved surface.

17 Claims, 30 Drawing Sheets

(EMBODIMENT 1, EXAMPLE 1)

SECTIONAL VIEW IN MAIN MAGNIFICATION DIRECTION (EMBODIMENT 2, EXAMPLE 2)
SECTIONAL VIEW IN MAIN MAGNIFICATION DIRECTION (EMBODIMENT 3, EXAMPLE 3)
SECTIONAL VIEW IN MAIN MAGNIFICATION DIRECTION (EMBODIMENT 4, EXAMPLE 4)
SECTIONAL VIEW IN SUB-MAGNIFICATION DIRECTION

FIG.9 (EMBODIMENT 5, EXAMPLE 5)
SECTIONAL VIEW IN MAIN MAGNIFICATION DIRECTION

FIG.10 (EMBODIMENT 5, EXAMPLE 5)
SECTIONAL VIEW IN SUB-MAGNIFICATION DIRECTION

FIG. 12 (EMBODIMENT 6, EXAMPLE 6) SECTIONAL VIEW IN SUB-MAGNIFICATION DIRECTION

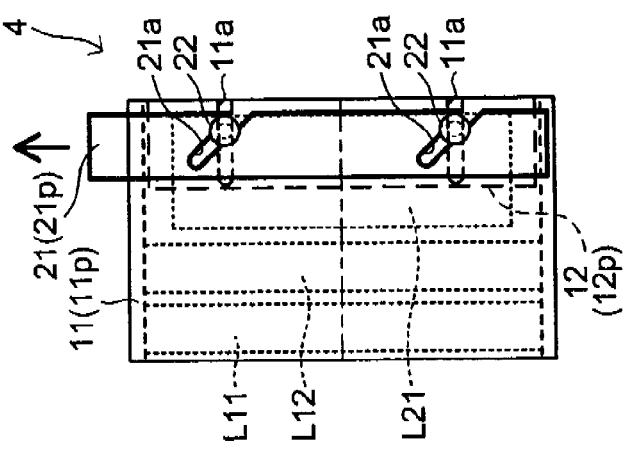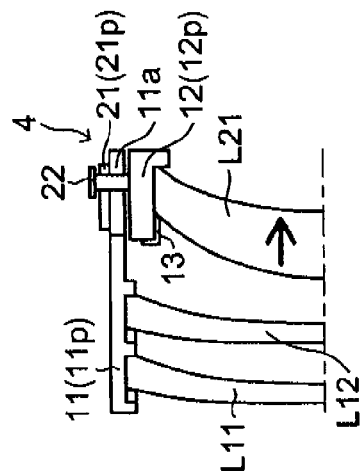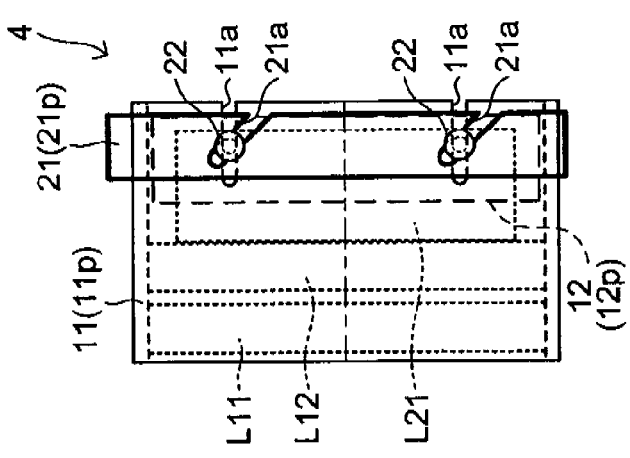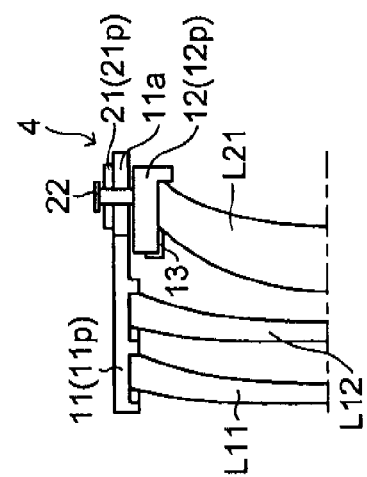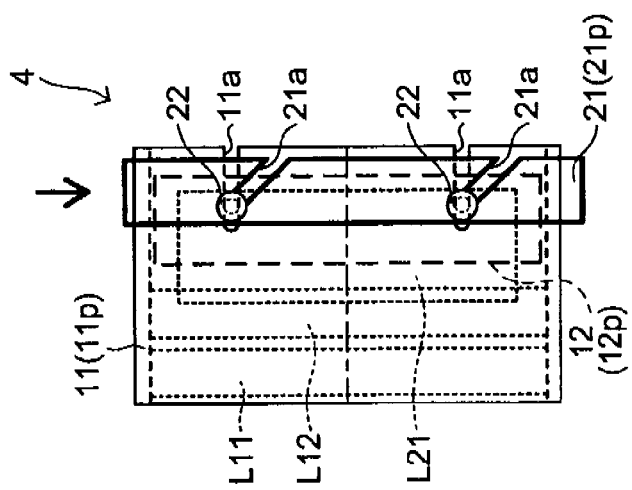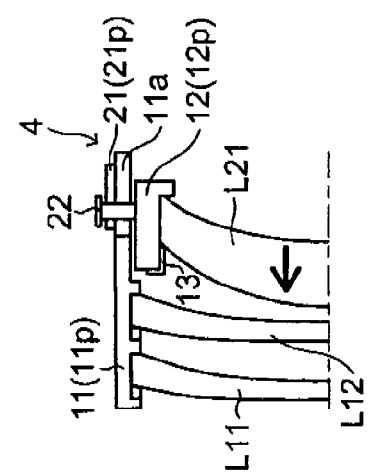

FIG.21
(EXAMPLE 1w)
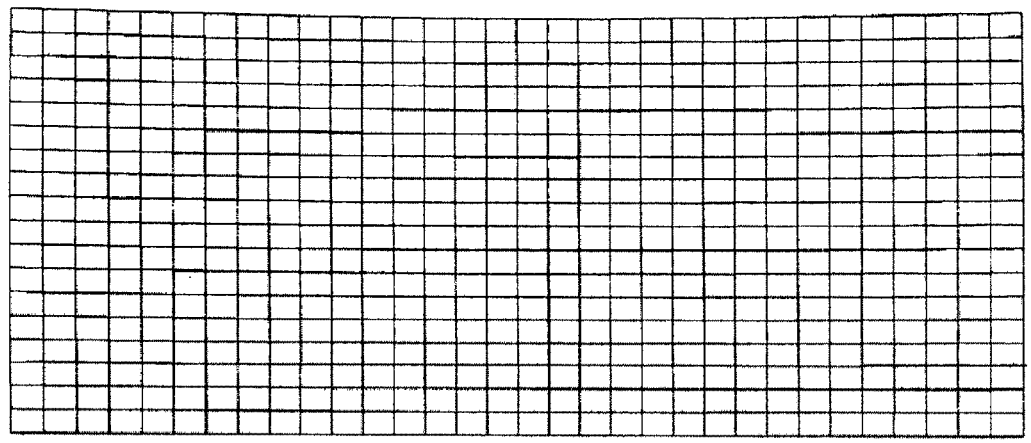
(EXAMPLE 1t)
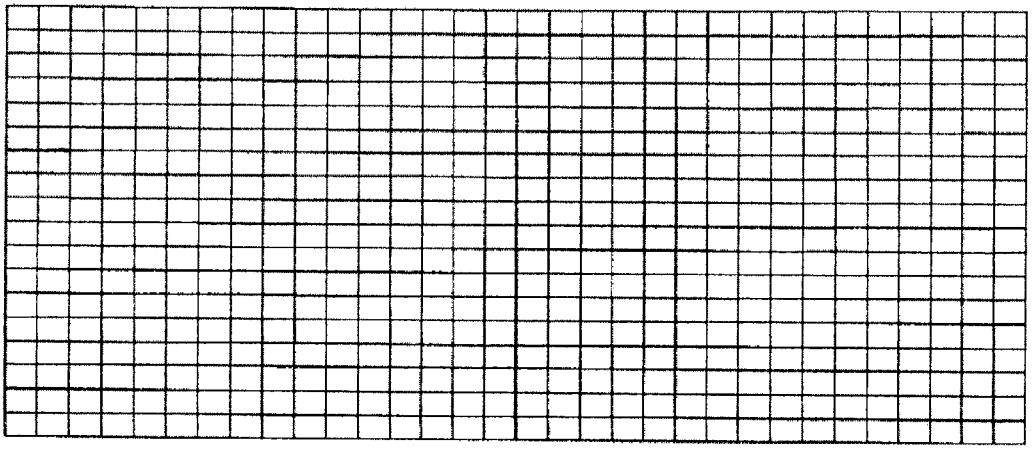

FIG.22
(EXAMPLE 2w)
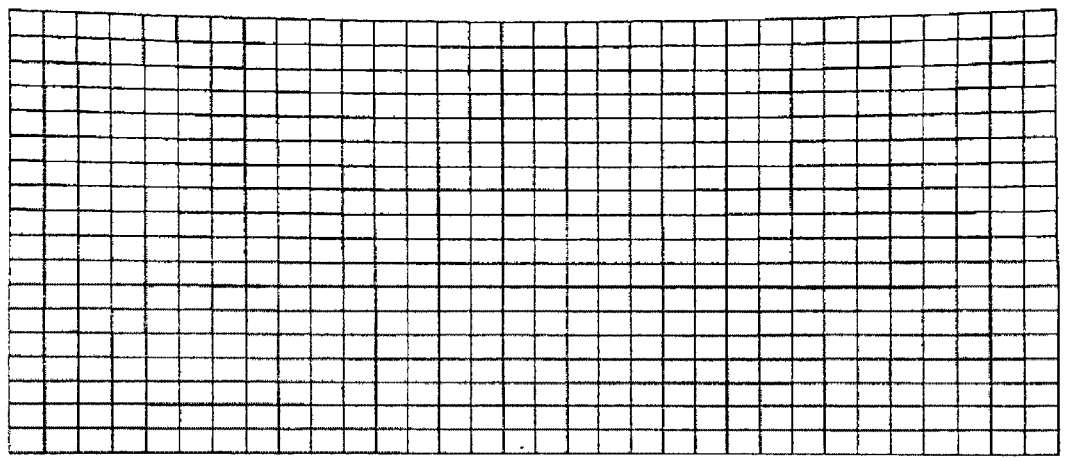
(EXAMPLE 2t)
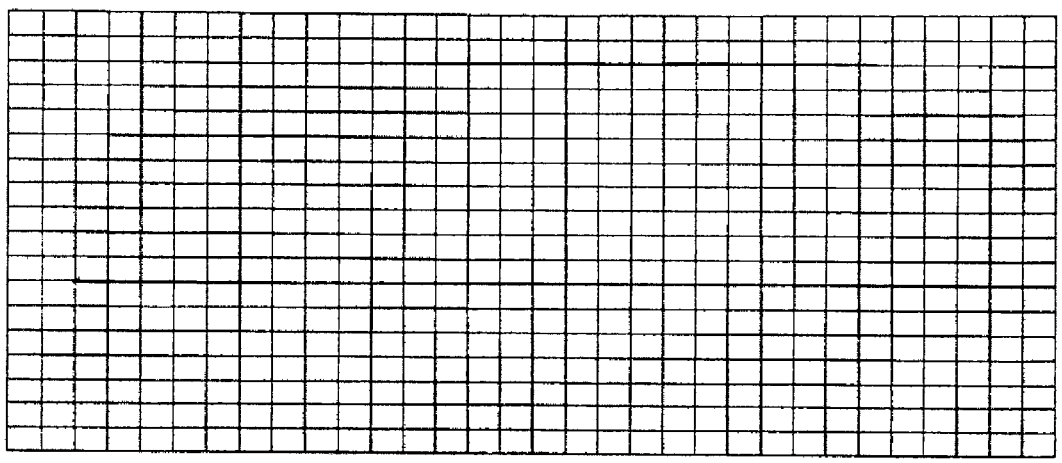

FIG.23
(EXAMPLE 3w)
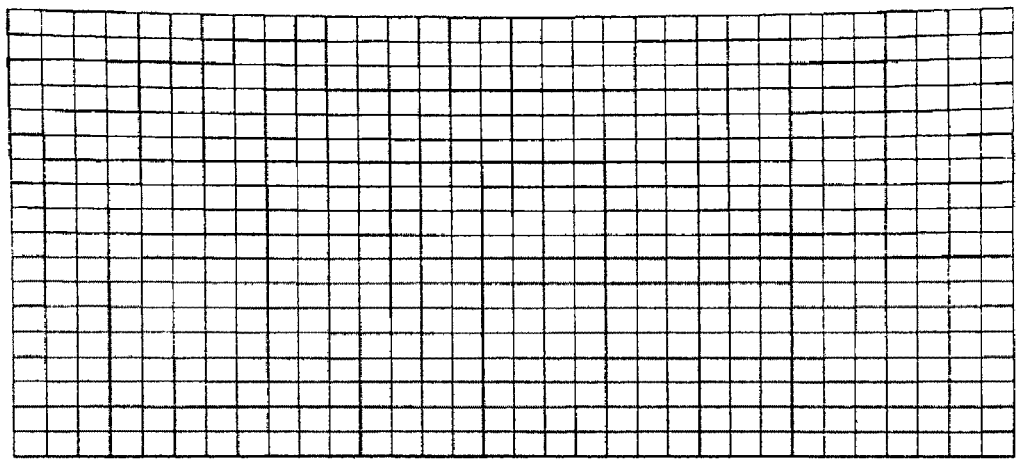
(EXAMPLE 3t)
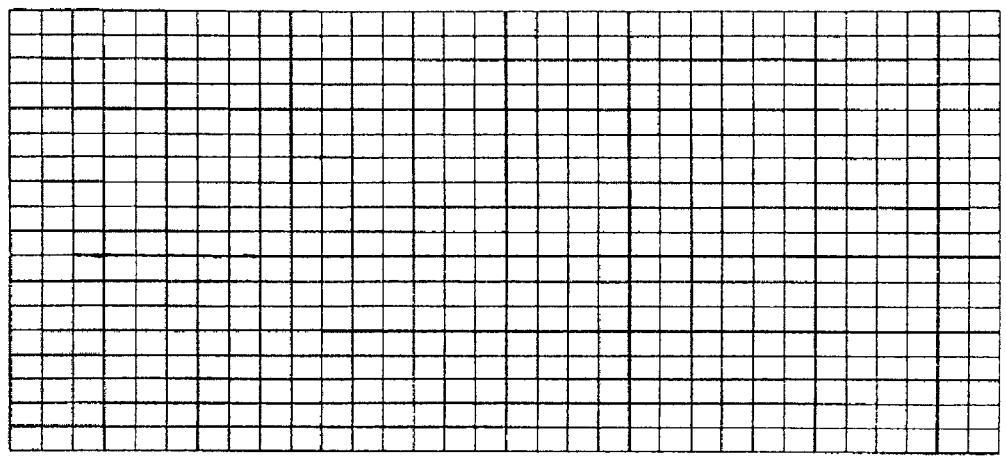

FIG.24
(EXAMPLE 4w1)
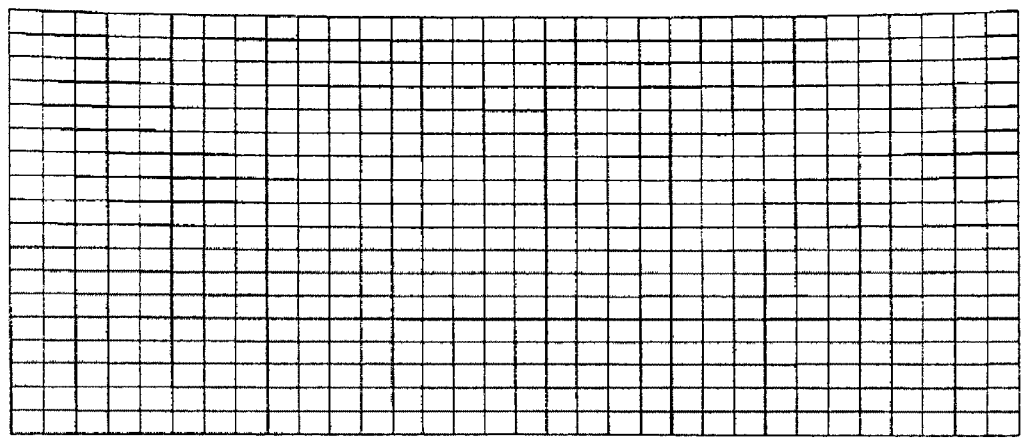
(EXAMPLE 4t1)
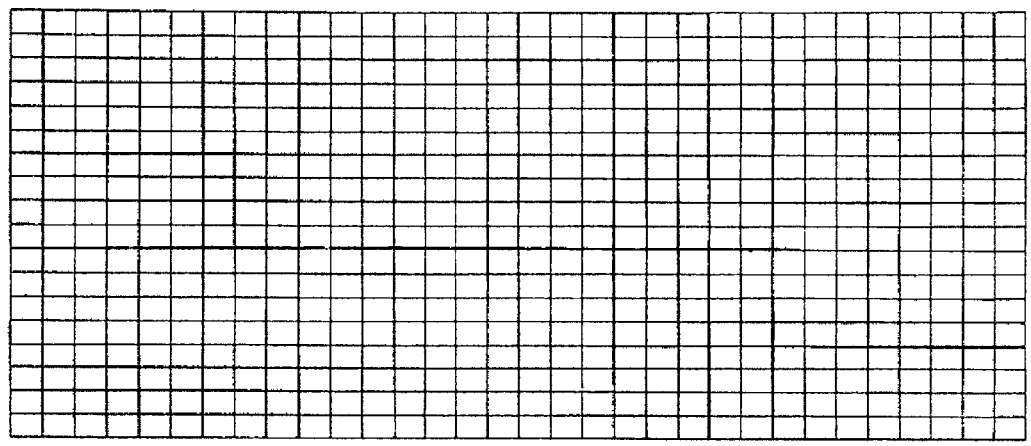

FIG.25
(EXAMPLE 4w2)
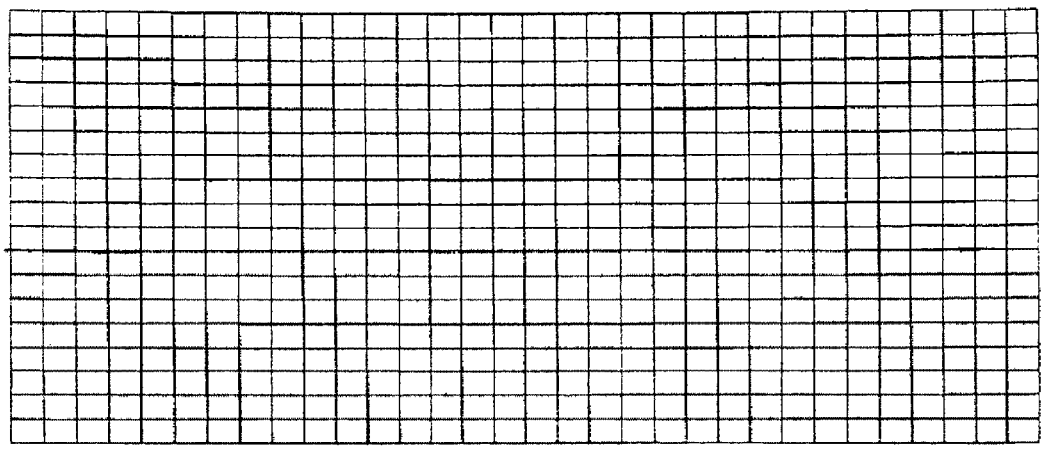
(EXAMPLE 4t2)
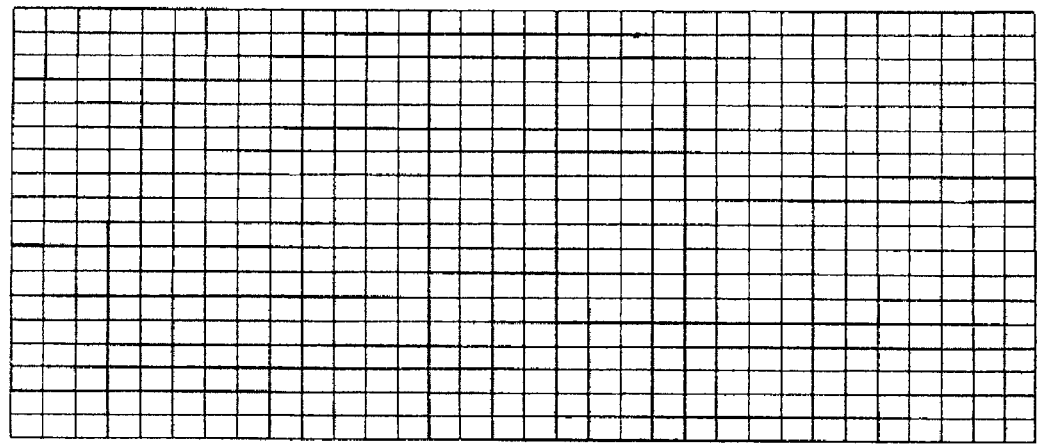

FIG.26
(EXAMPLE 4w3)
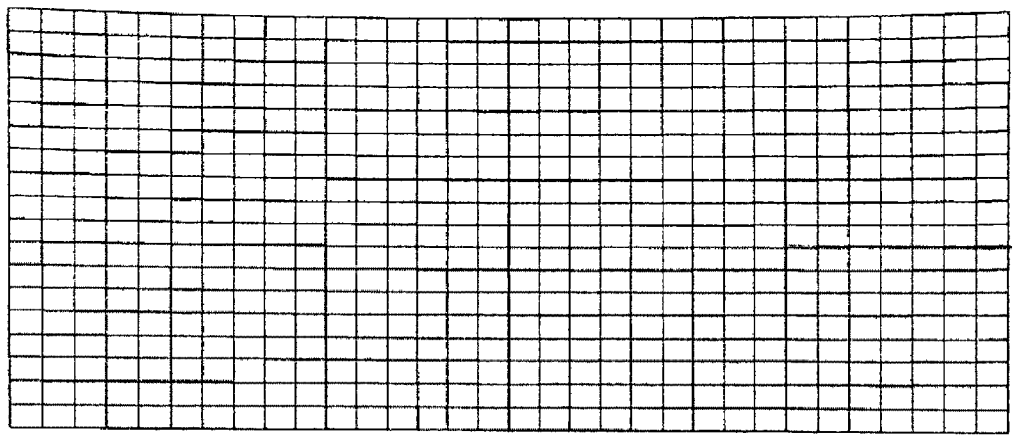
(EXAMPLE 4t3)
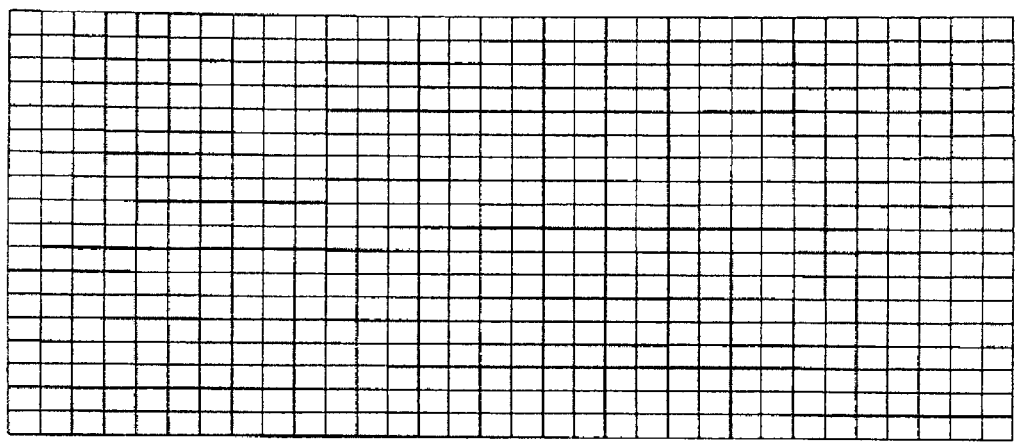

FIG.27
(EXAMPLE 5w1)
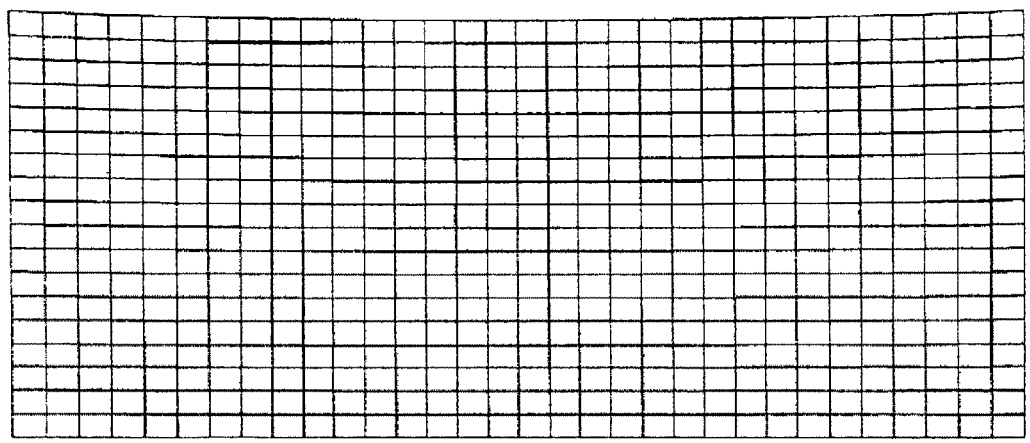
(EXAMPLE 5t1)
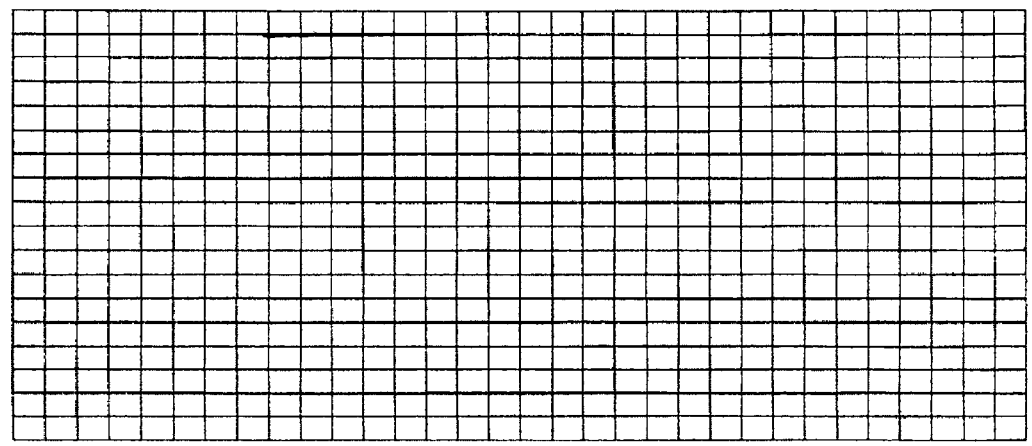

FIG.28
(EXAMPLE 5w2)
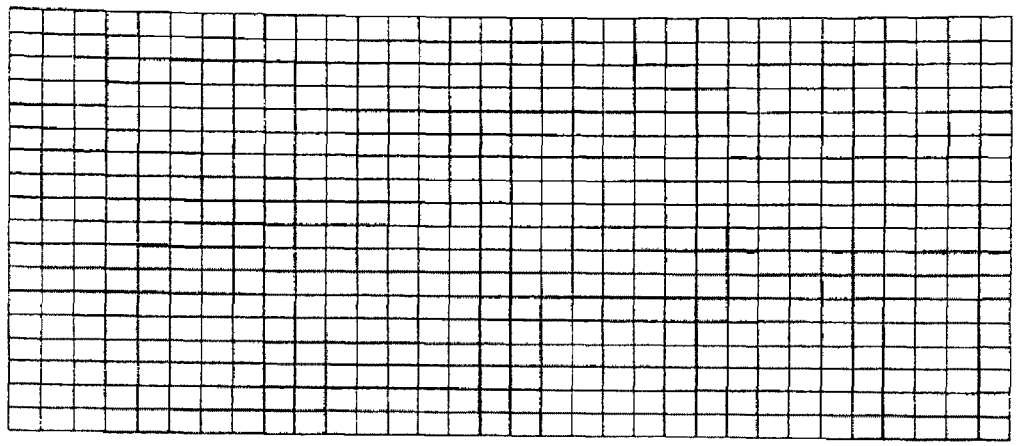
(EXAMPLE 5t2)
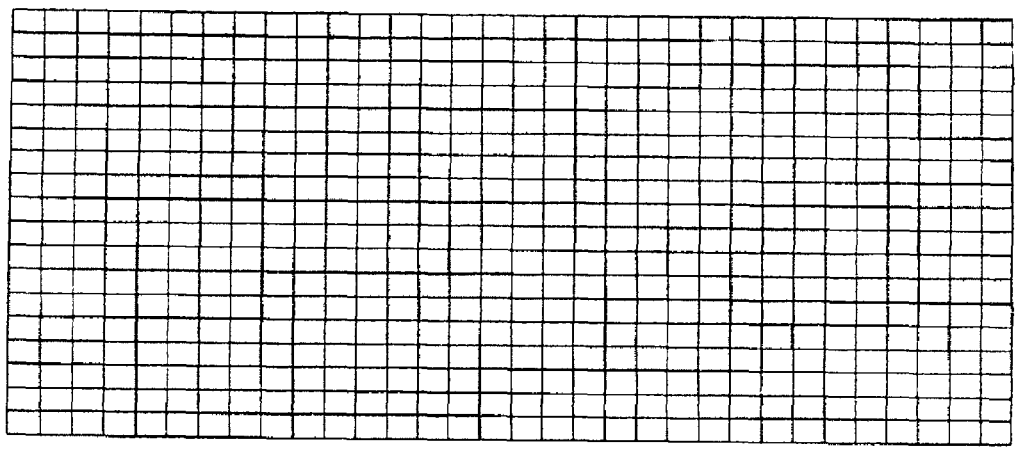

FIG.29
(EXAMPLE 5w3)
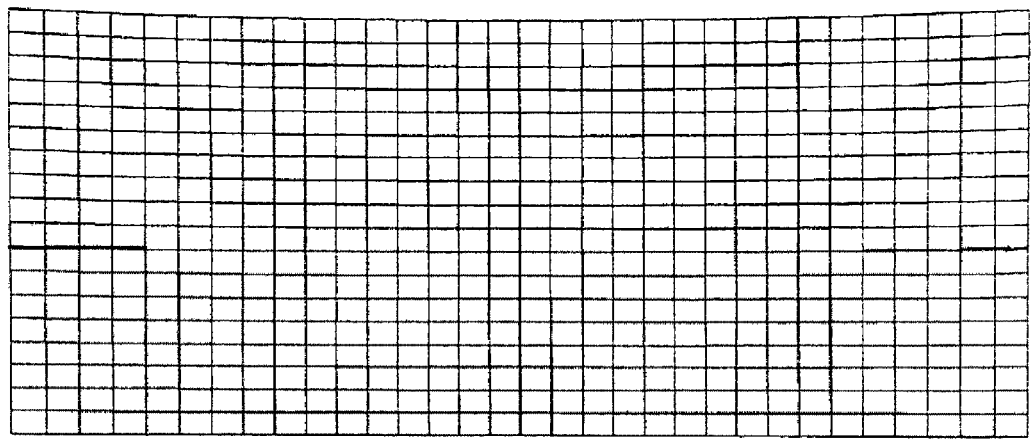
(EXAMPLE 5t3)
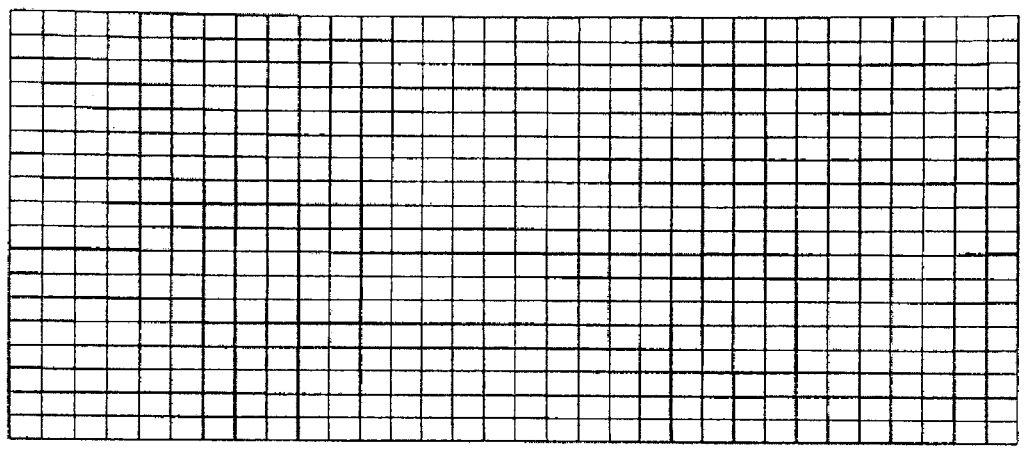

FIG.30
(EXAMPLE 6w)
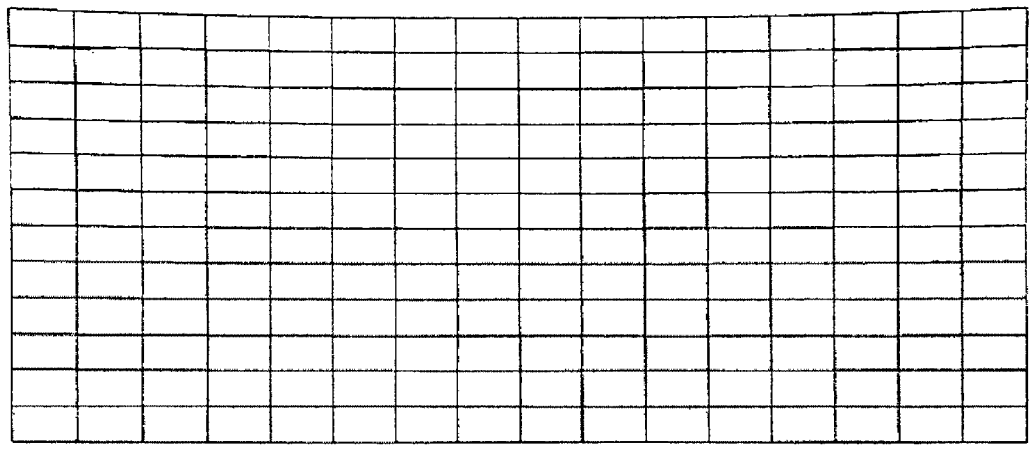
(EXAMPLE 6t)
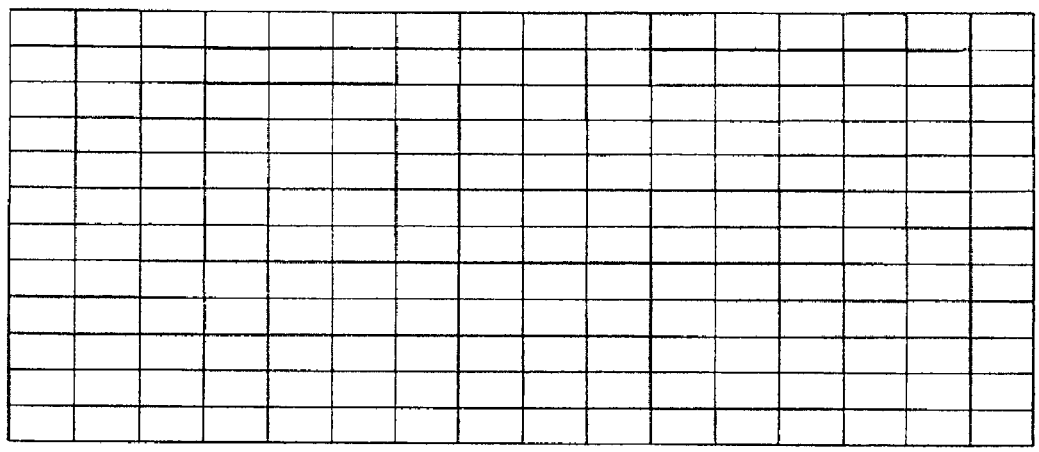

FIG.31
(CONVENTIONAL EXAMPLE 1w)
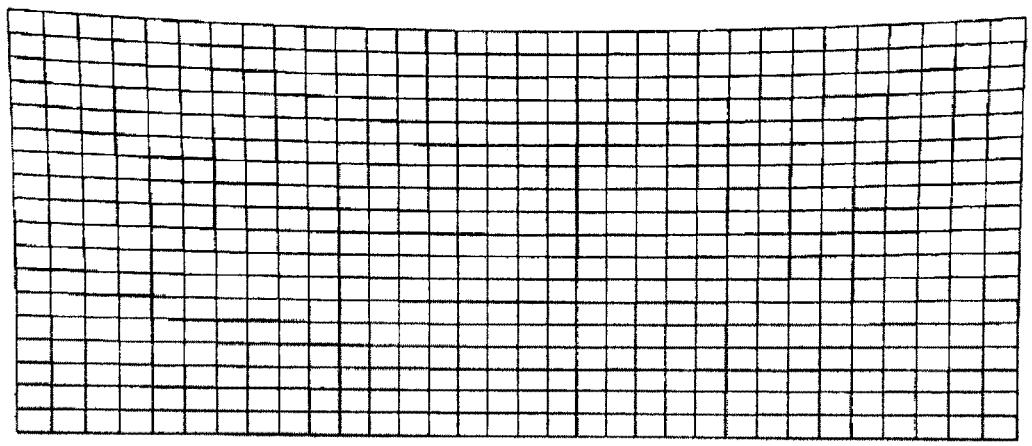
(CONVENTIONAL EXAMPLE 1t)
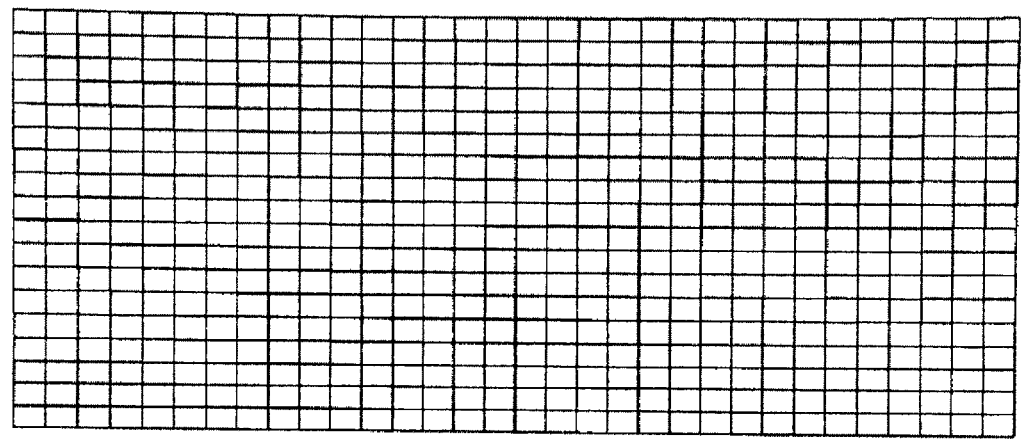

FIG.32
(CONVENTIONAL EXAMPLE 2w)
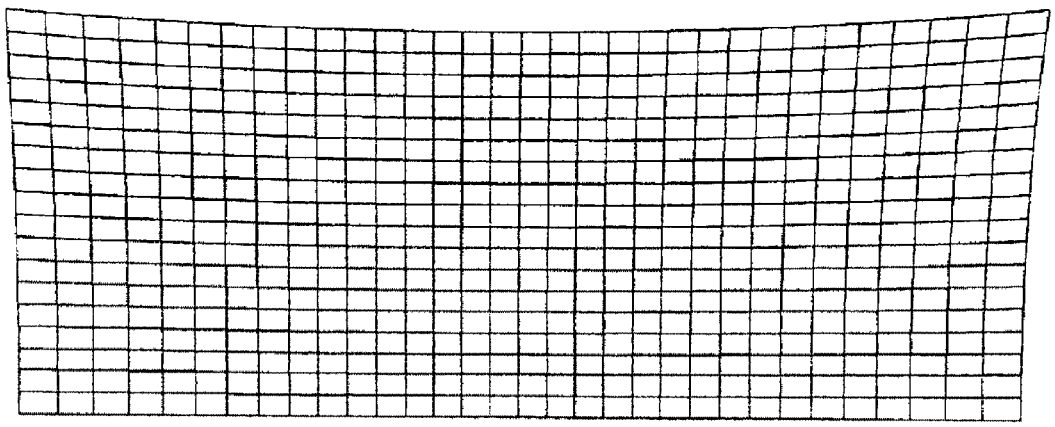
(CONVENTIONAL EXAMPLE 2t)
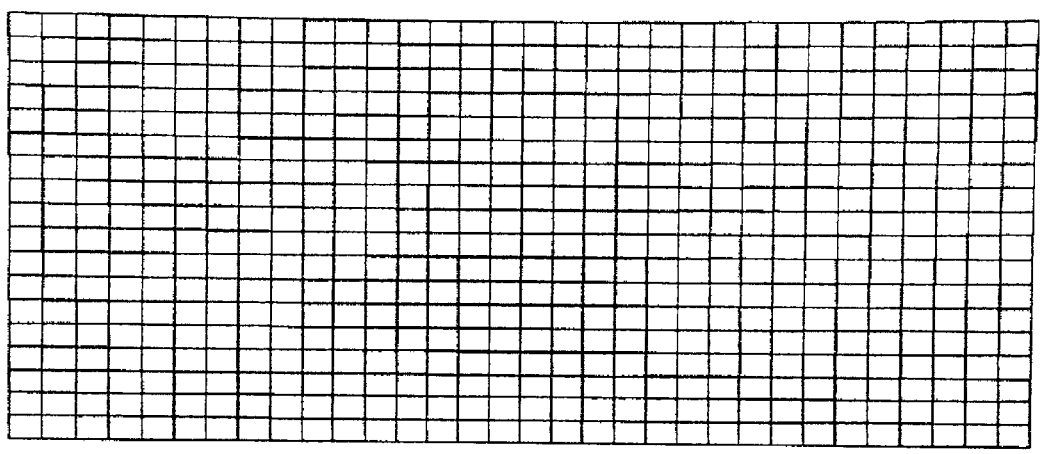

ANAMORPHIC CONVERTER AND IMAGE PROJECTION SYSTEM

This application is based on Japanese Patent Application No. 2008-152054 filed on Jun. 10, 2008 in Japan, the contents of which are hereby incorporated by reference.

BACKGROUND OF THE INVENTION

1. Field of the Invention

The present invention relates to an anamorphic converter that projects an image at magnification ratios different from each other in a main magnification direction and a sub-magnification direction, and to an image projection system that includes the anamorphic converter.

2. Description of Related Art

In an image projection system that projects an image displayed on a display device through a projection lens to a screen, it is possible to widen a field angle in, for example, a horizontal direction in the time of image projection by disposing an anamorphic converter between the projection lens and the screen. It is possible to compose such an anamorphic converter by using, for example, a plurality of cylindrical lenses (U.S. Pat. No. 5,930,050) or by using a plurality of prisms (U.S. Pat. No. 6,678,095).

Assuming that two directions are perpendicular to each other in a plane that meets an optical axis, a cylinder lens does not have power in one direction, and a prism has no power in any of the two directions. Accordingly, in the anamorphic converters disclosed in U.S. Pat. Nos. 5,930,050 and 6,678,095, it is impossible to correct a distortion in the direction where there is no power. FIGS. 31 and 32 show distortions of a projected surface on a wide-angle side (w) and an telephoto side (t) respectively in a case where the anamorphic converters disclosed in U.S. Pat. Nos. 5,930,050 and 6,678,095 are used and an image displayed on a display device is projected onto a projected surface in a state where an upper end or a lower end of a display surface of the display device is substantially aligned with optical axes of the projection lens and the anamorphic converter. As shown in these figures, if the anamorphic converters in U.S. Pat. Nos. 5,930,050 and 6,678,095 are used, a distortion of the projected area becomes remarkable especially on the wide-angle side.

It is possible to correct a distortion of a projected area by using a curved screen that is formed into a cylindrical curved surface shape. However, in a curved screen, it is possible to correct a distortion in a horizontal direction (transverse line), but impossible to correct a distortion in a vertical direction (longitudinal line), which is insufficient correction of a distortion. Besides, because a curved screen is expensive, it is desirable to correct a distortion without using a curved screen.

SUMMARY OF THE INVENTION

The present invention has been made to solve the problems described above, and it is an object of the present invention to provide an anamorphic converter that is capable of projecting an image whose distortion is curbed without using an expensive curved screen, and to provide an image projection system that includes the anamorphic converter.

An anamorphic converter according to the present invention projects an image at magnification ratios that are different from each other in a main magnification direction and a sub-magnification direction, comprises, in order from a projected-surface side: a first group having one or more lens elements and a negative power at least in the main magnification direction and a second group having one or more lens elements and a positive power at least in the main magnification direction, wherein of optical surfaces, a last surface of the first group and a first surface of the second group: [1] have a power in both main magnification and sub-magnification directions; [2] are convex toward the projected-surface side in both main magnification and sub-magnification directions in a region having an area that is ¼ or more of an optical effective region area including a center portion of each of the last and first optical surface; and [3] at least one of the last and first optical surfaces is a free curved surface.

DESCRIPTION OF THE DRAWINGS

The above and other objects of the present invention will be more apparent by referring to the following description of preferred embodiments and attached drawings.

FIGS. 15A, 15B and 15C are each a plan view and a sectional view of the adjustment mechanism.

FIG. 21 is a distortion view of a projected area on a wide-angle side and a telephoto side in the embodiment 1.

FIG. 22 is a distortion view of a projected area on a wide-angle side and a telephoto side in the embodiment 2.

FIG. 23 is a distortion view of a projected area on a wide-angle side and a telephoto side in the embodiment 3.

FIG. 24 is a distortion view of a projected area on a wide-angle side and a telephoto side in a case where a mounted optical system 1 is used in the embodiment 4.

FIG. 25 is a distortion view of the projected area on the wide-angle side and the telephoto side in a case where a mounted optical system 2 is used in the embodiment 4.

FIG. 26 is a distortion view of the projected area on the wide-angle side and the telephoto side in a case where a mounted optical system 3 is used in the embodiment 4.

FIG. 27 is a distortion view of a projected area on a wide-angle side and a telephoto side in a case where a mounted optical system 1 is used in the embodiment 5.

FIG. 28 is a distortion view of the projected area on the wide-angle side and the telephoto side in a case where a mounted optical system 2 is used in the embodiment 5.

FIG. 29 is a distortion view of the projected area on the wide-angle side and the telephoto side in a case where a mounted optical system 3 is used in the embodiment 5.

FIG. 30 is a distortion view of a projected area on a wide-angle side and a telephoto side in the embodiment 6.

FIG. 31 is a distortion view of a projected area on a wide-angle side and a telephoto side in a case where an image is projected using a conventional anamorphic converter.

FIG. 32 is a distortion view of the projected area on the wide-angle side and the telephoto side in a case where an image is projected using a another conventional anamorphic converter.

DESCRIPTION OF THE PREFERRED EMBODIMENTS

Embodiments of the present inventions are explained below based on drawings.

1. STRUCTURE OF IMAGE PROJECTION SYSTEM

Figure 1:
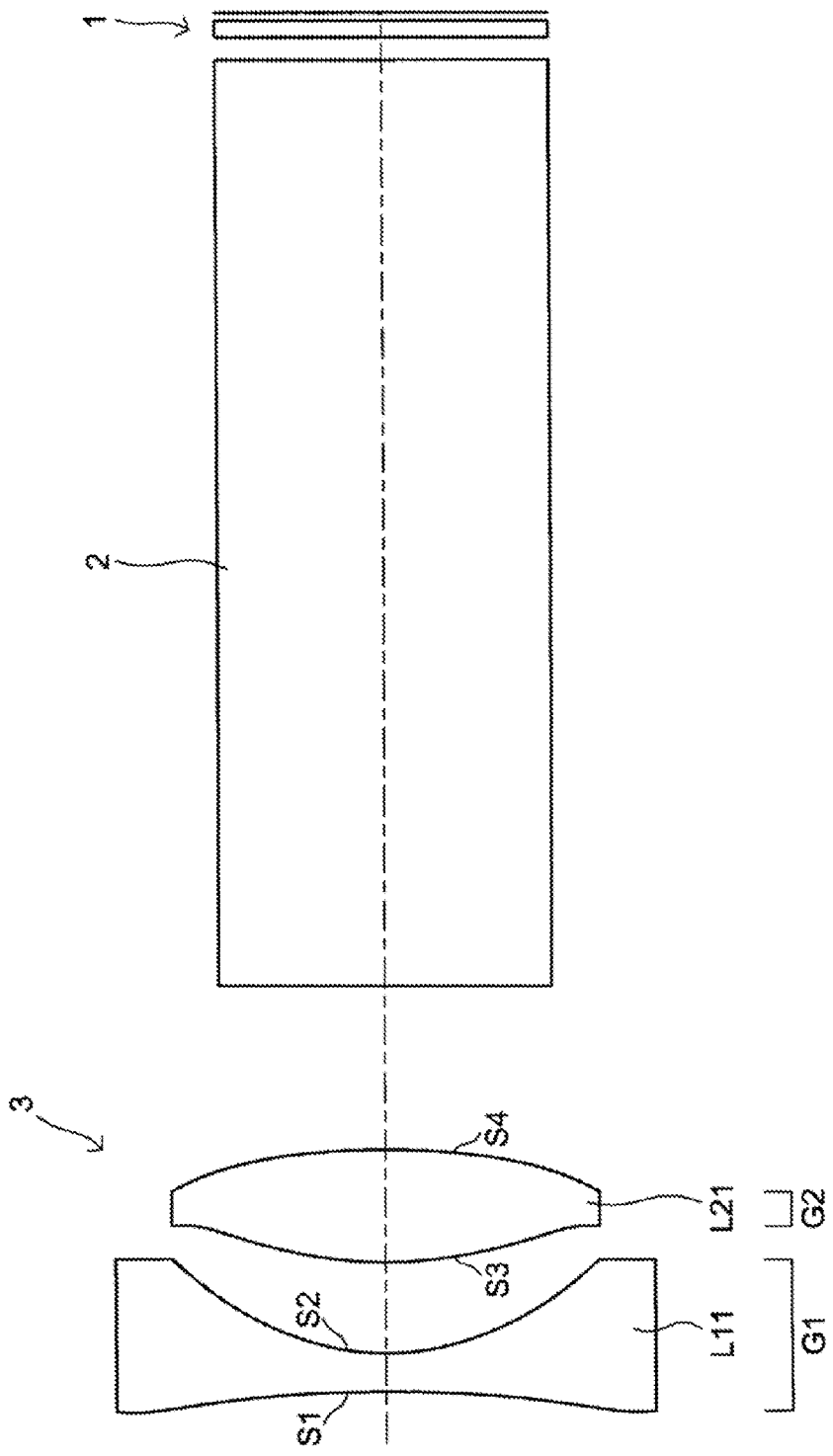
FIG. 1 is a sectional view along a main magnification direction of an image projection system according to an embodiment 1 of the present invention.
Figure 2:
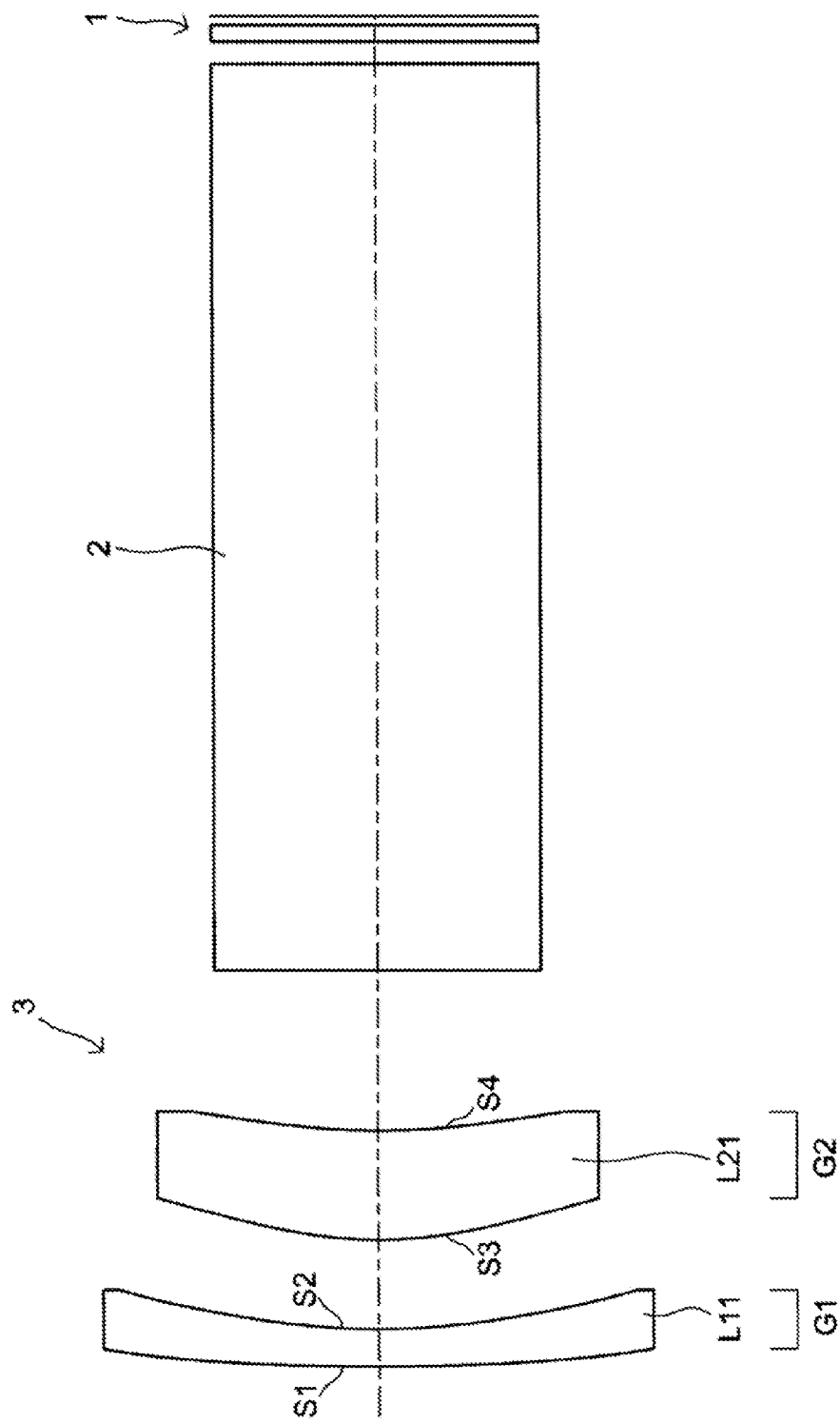
FIG. 2 is a sectional view along a sub-magnification direction of the image projection system.
Figure 3:
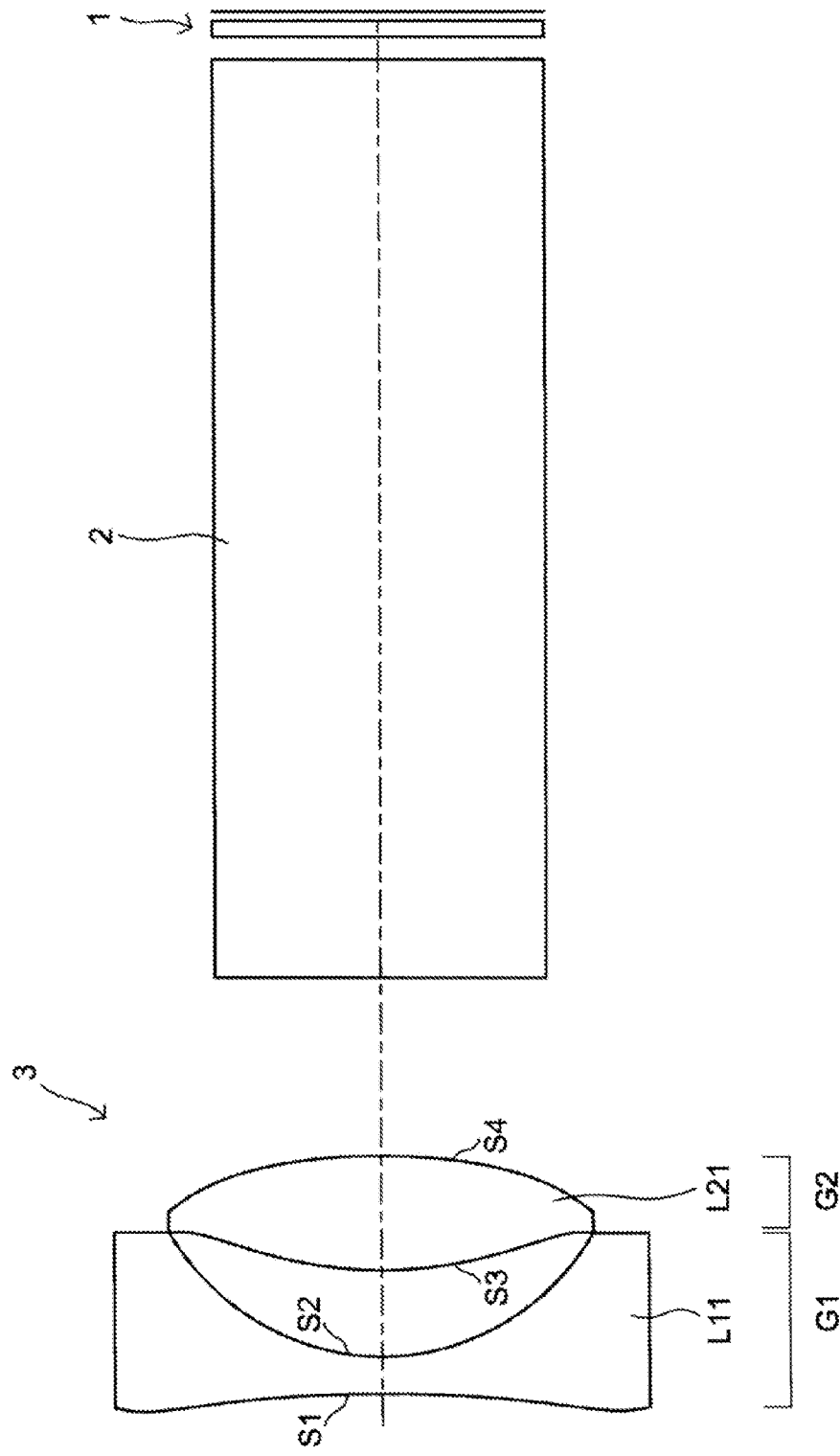
FIG. 3 is a sectional view along a main magnification direction of an image projection system according to an embodiment 2 of the present invention.
Figure 4:
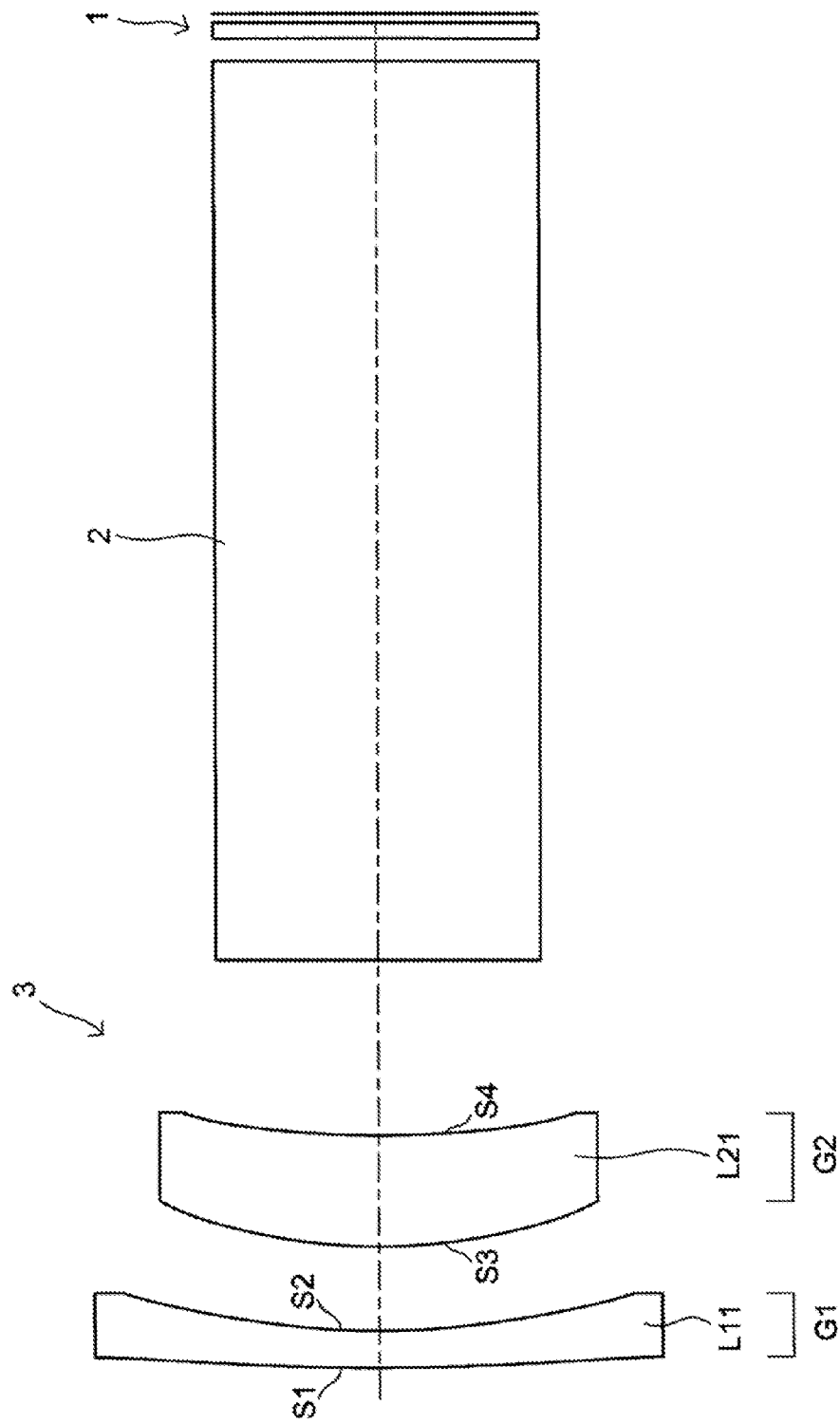
FIG. 4 is a sectional view along a sub-magnification direction of the image projection system.
Figure 5:
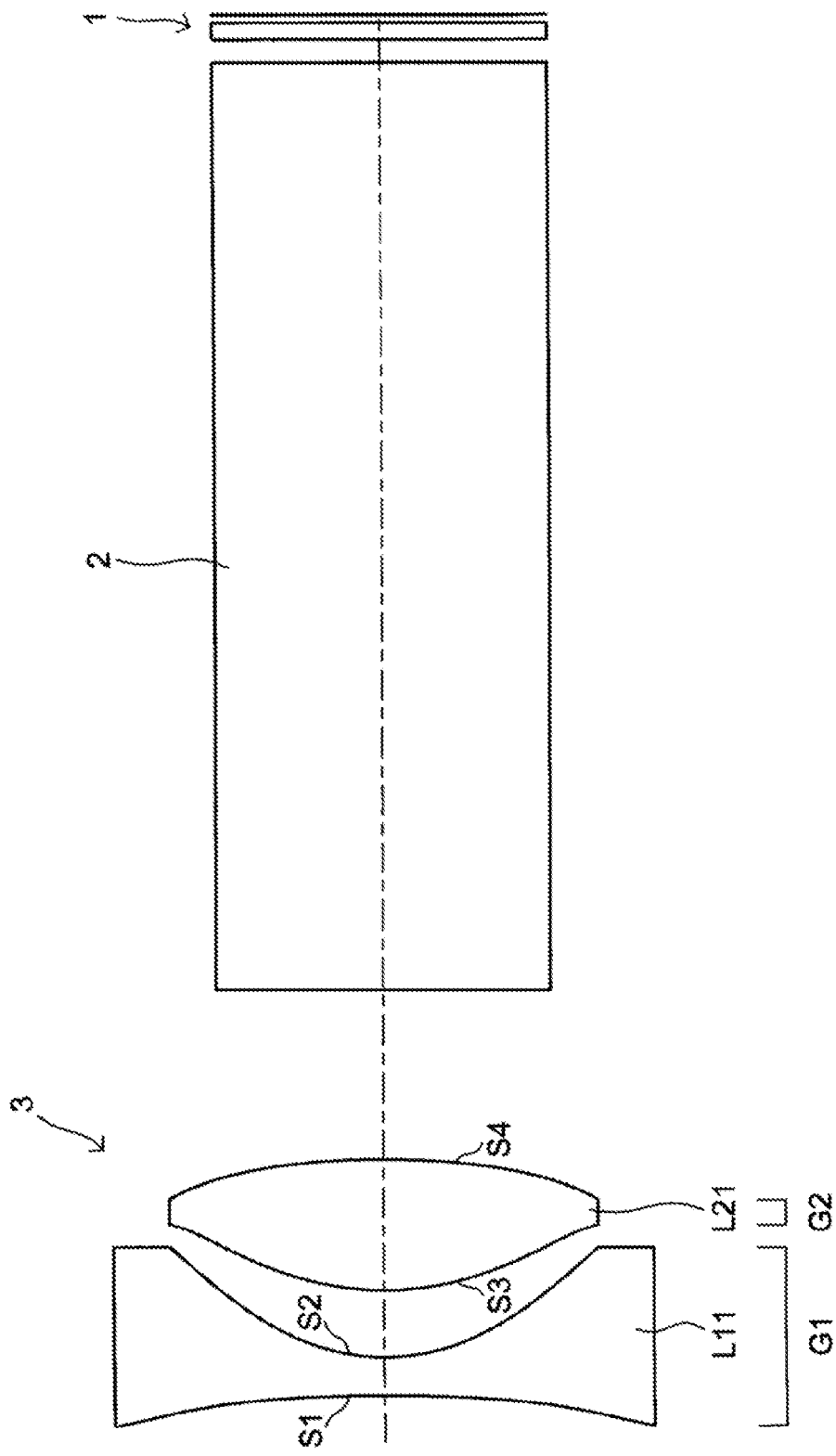
FIG. 5 is a sectional view along a main magnification direction of an image projection system according to an embodiment 3 of the present invention.
Figure 6:
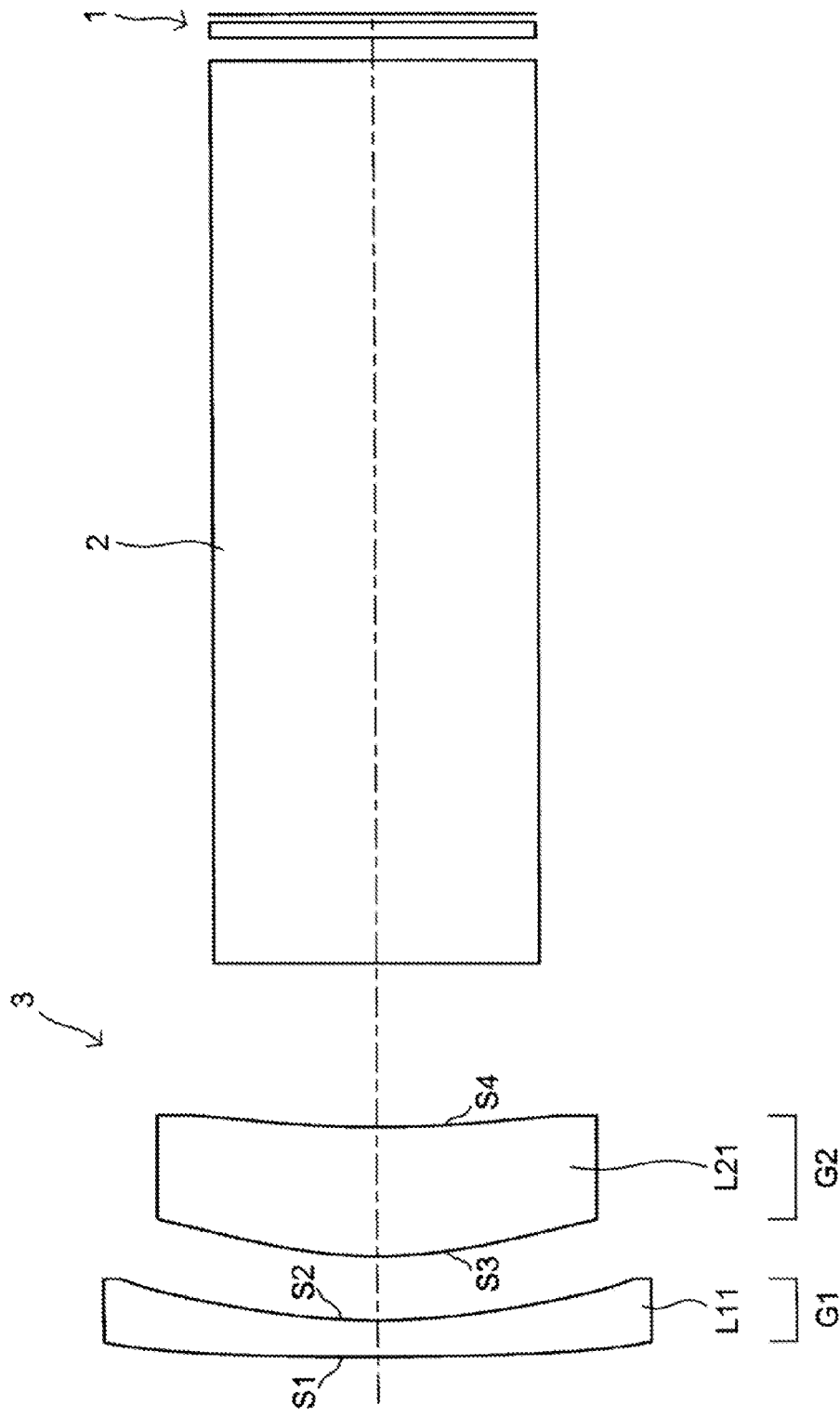
FIG. 6 is a sectional view along a sub-magnification direction of the image projection system.
Figure 7:
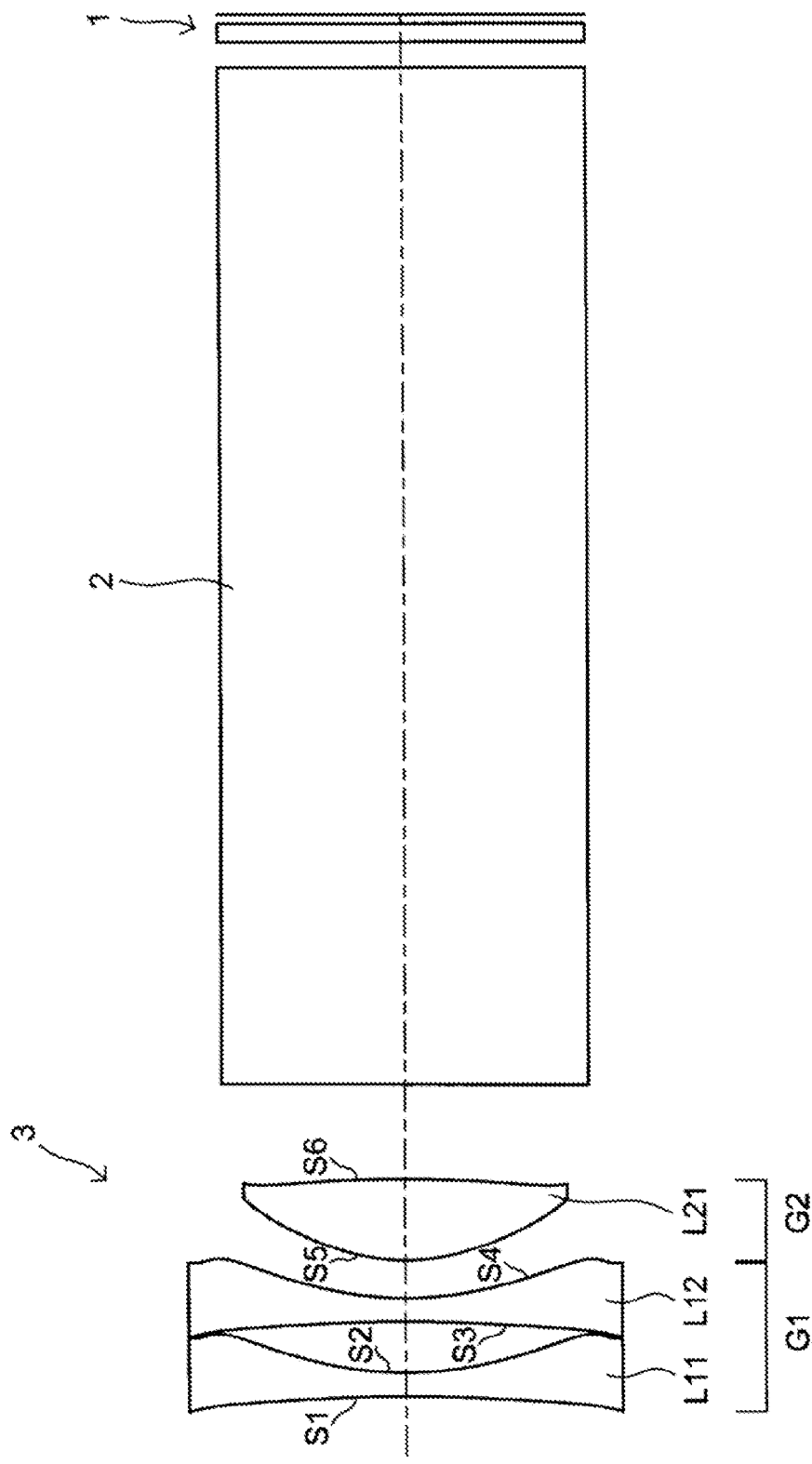
FIG. 7 is a sectional view along a main magnification direction of an image projection system according to an embodiment 4 of the present invention.
Figure 8:
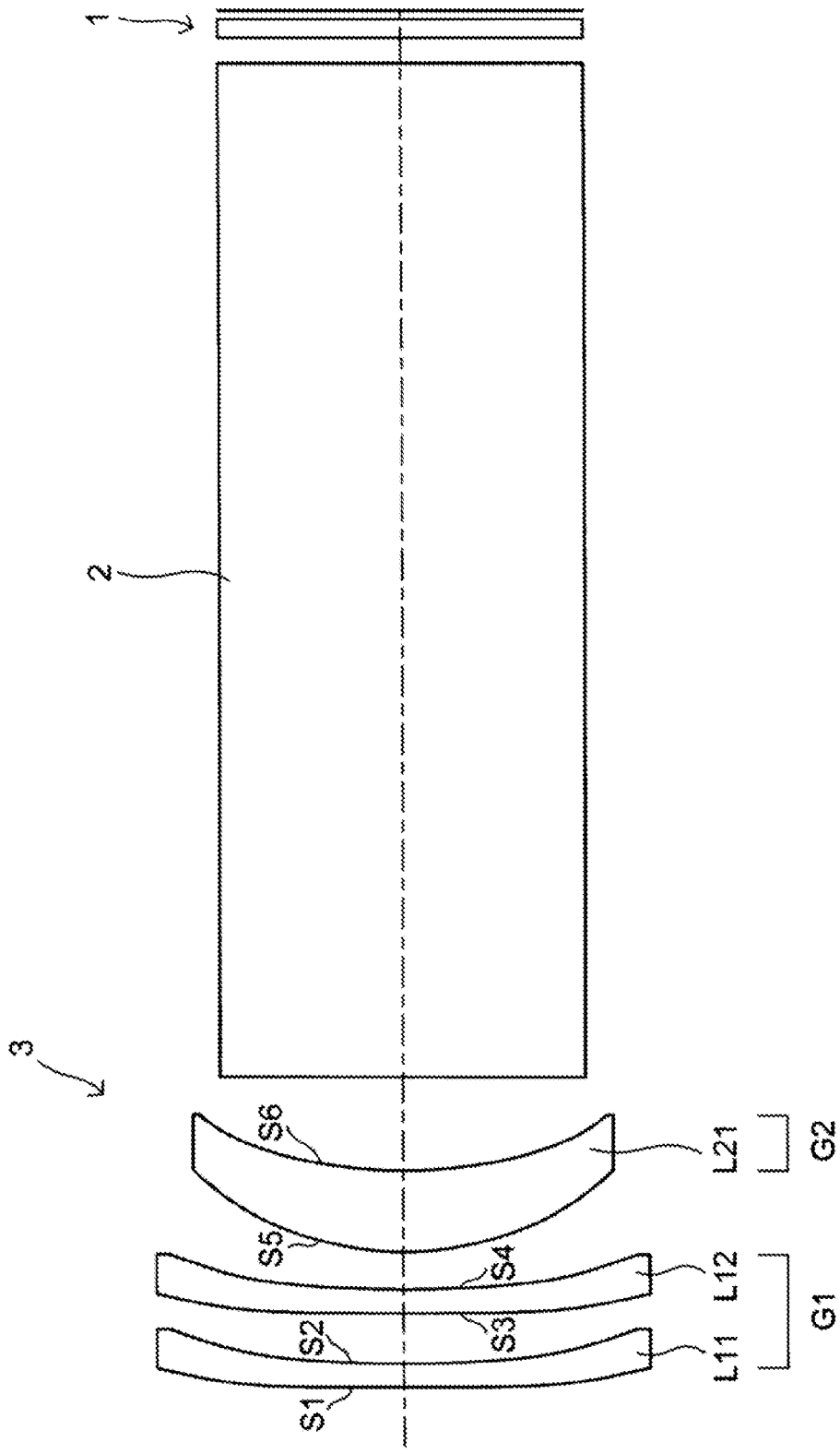
FIG. 8 is a sectional view along a sub-magnification direction of the image projection system.
Figure 9:
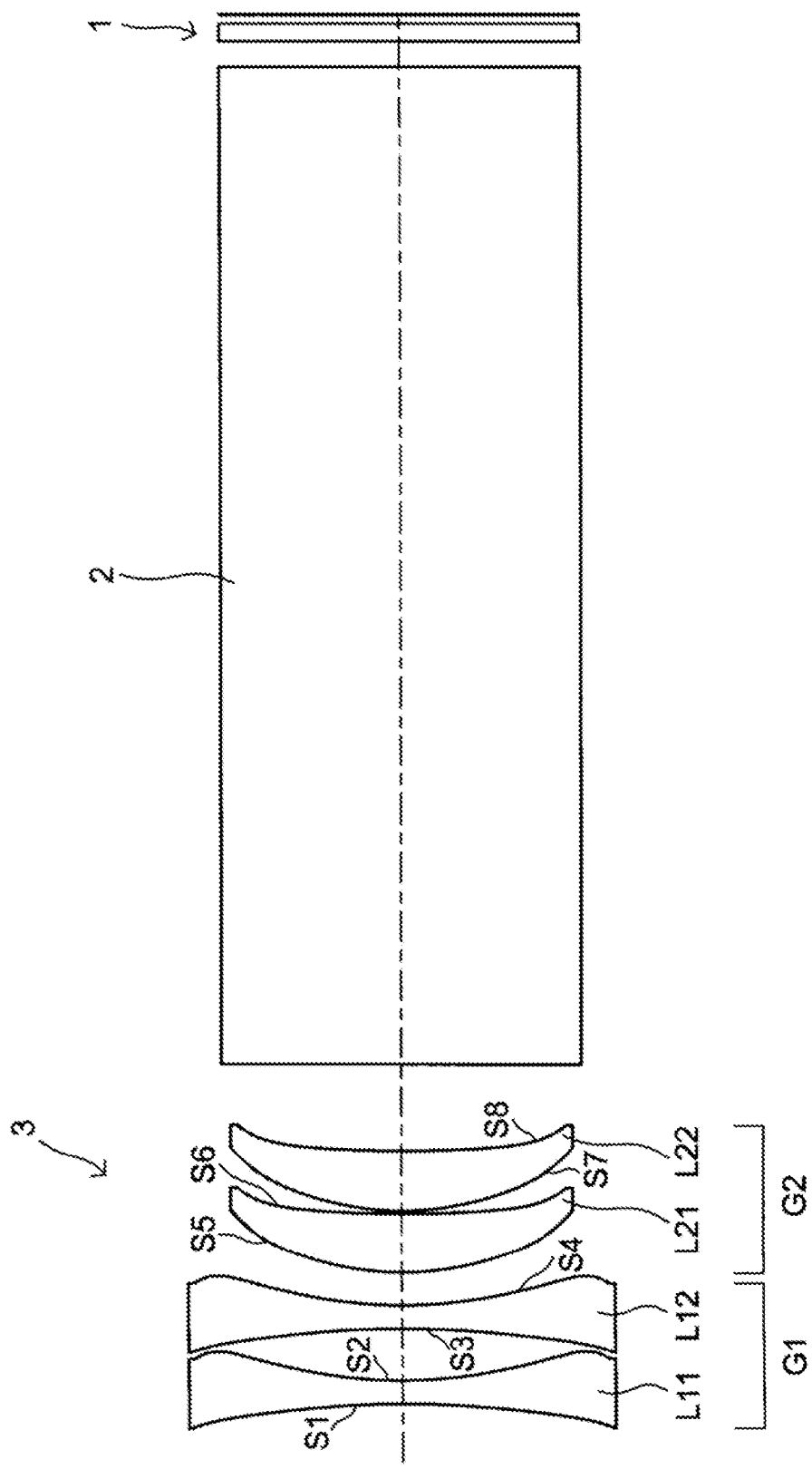
FIG. 9 is a sectional view along a main magnification direction of an image projection system according to an embodiment 5 of the present invention.
Figure 10:
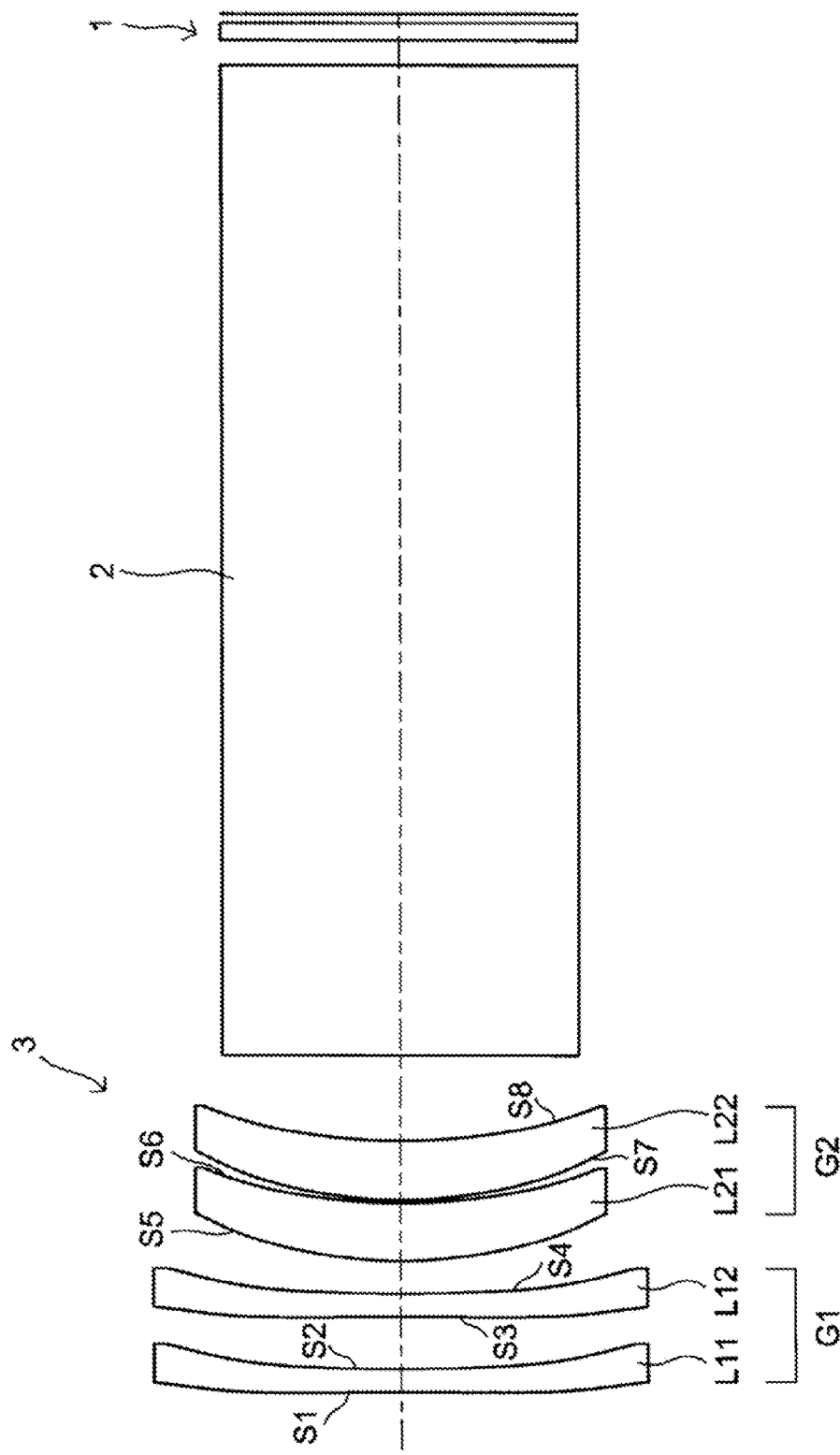
FIG. 10 is a sectional view along a sub-magnification direction of the image projection system.
Figure 11:
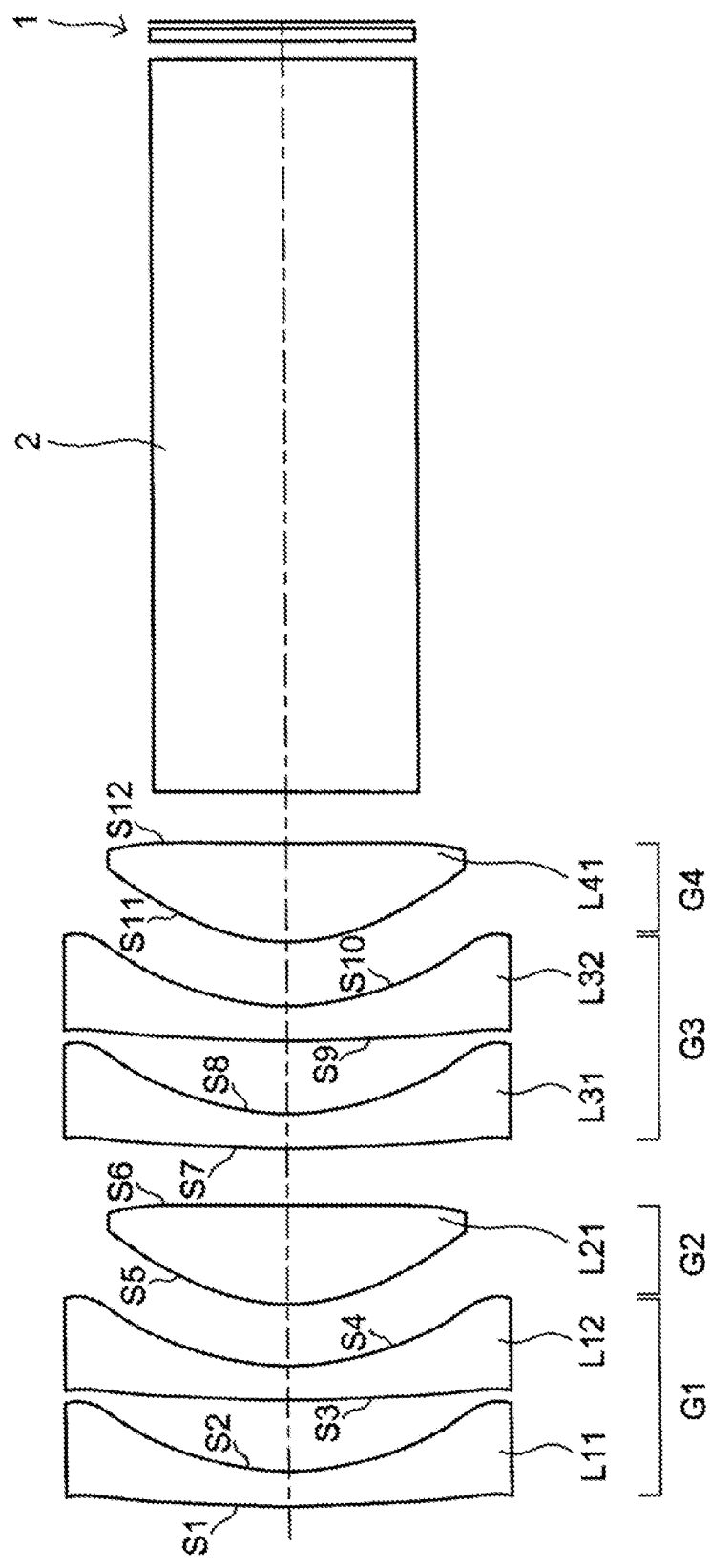
FIG. 11 is a sectional view along a main magnification direction of an image projection system according to an embodiment 6 of the present invention.
Figure 12:
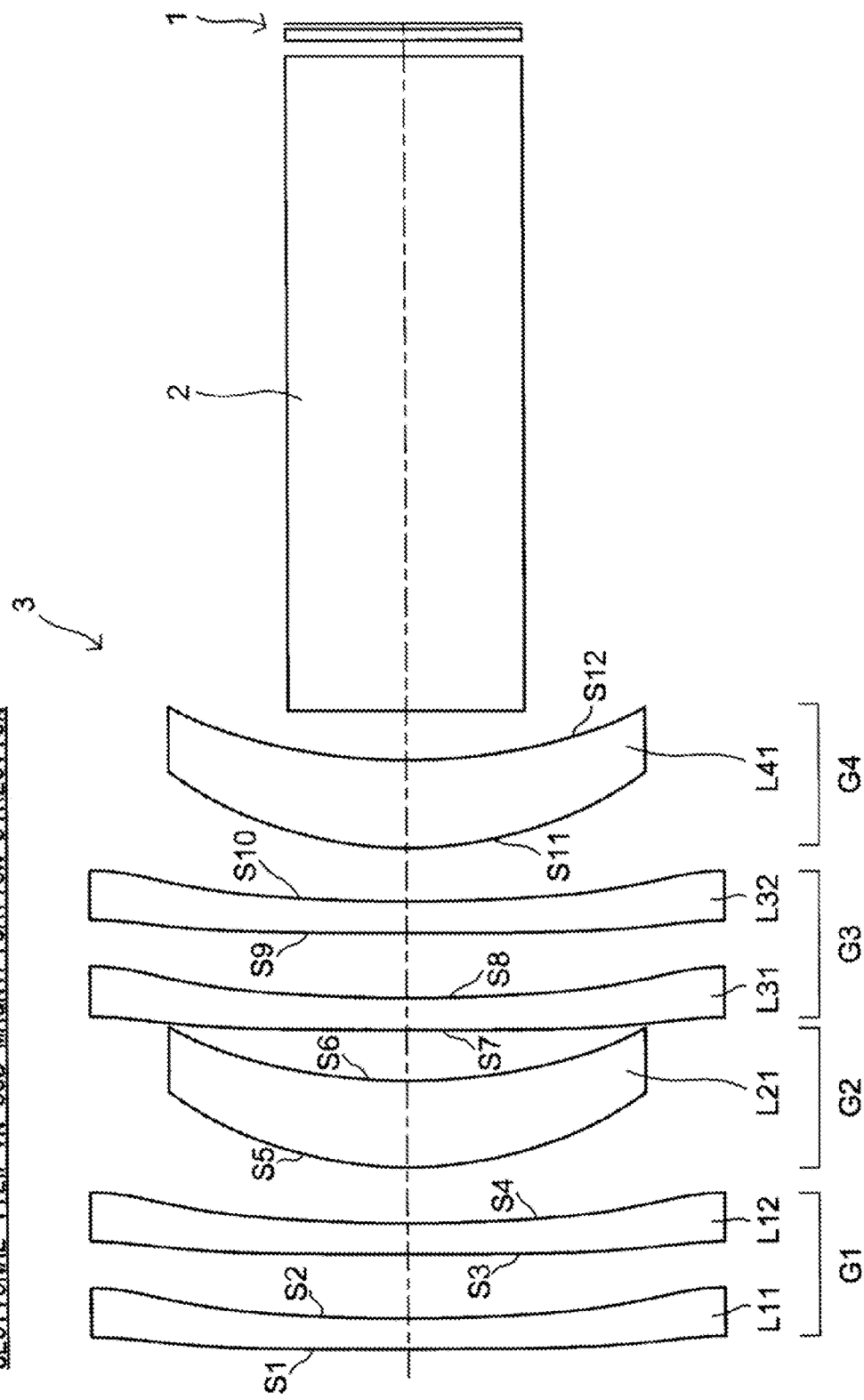
FIG. 12 is a sectional view along a sub-magnification direction of the image projection system.

FIGS. 1 to 12 are sectional views showing schematic structures of image projection systems according to embodiments 1 to 6. In more detail, FIGS. 1 and 2 are sectional views along a main magnification direction and a sub-magnification direction respectively of an image projection system according to the embodiment 1. FIGS. 3 and 4 are sectional views along a main magnification direction and a sub-magnification direction respectively of an image projection system according to the embodiment 2. FIGS. 5 and 6 are sectional views along a main magnification direction and a sub-magnification direction respectively of an image projection system according to the embodiment 3. FIGS. 7 and 8 are sectional views along a main magnification direction and a sub-magnification direction respectively of an image projection system according to the embodiment 4. FIGS. 9 and 10 are sectional views along a main magnification direction and a sub-magnification direction respectively of an image projection system according to the embodiment 5. FIGS. 11 and 12 are sectional views along a main magnification direction and a sub-magnification direction respectively of an image projection system according to the embodiment 6. Here, the main magnification direction means, for example, a horizontal direction (transverse direction, right-to-left direction), and the sub-magnification direction means, for example, a vertical direction (longitudinal direction, up-to-down direction).

The image projection systems in the embodiments 1 to 6 include a display device 1, a projection lens 2, and an anamorphic converter 3. The display device 1 displays an image and is composed of, for example, an optical modulation device such as a liquid crystal display device and a DMD (Digital Micromirror Device; from Texas Instruments US). The projection lens 2 is an optical system that projects an image displayed on the display device 1 onto a projected surface (e.g., a screen or a wall). The anamorphic converter 3 is a lens system that projects an image at magnification ratios different from each other in the main magnification direction and the sub-magnification direction and is removably disposed in front (the magnification side, the projected-surface side) of the projection lens 2.

Here, the "magnification ratio" means a projected area width with the anamorphic converter 3 mounted divided by a projected area width with the anamorphic converter 3 demounted. Accordingly, if the magnification ratio of the anamorphic converter 3 is larger than 1, a projected image is magnified in the main magnification direction or in the sub-magnification direction. If the magnification ratio is equal to 1, a projected image is neither magnified nor reduced in the main magnification direction or in the sub-magnification direction. If the magnification ratio is smaller than 1, a projected image is reduced in the main magnification direction or in the sub-magnification direction.

2. STRUCTURE OF ANAMORPHIC CONVERTER

Hereinafter, detailed structures of the anamorphic converters 3 in the embodiments 1 to 6 are described. The anamorphic converter 3 is composed of lens elements that have a free curved surface as described later and here the free curved surface is defined with a plane (the radius of curvature is ∞) used as the reference. In other words, the term on a spherical surface (the first term) in a numerical expression described later is regarded 0. In this case, because the power becomes 0 in the paraxial theory, here the words "positive power," "negative power," and "power is present" are redefined as follows. In other words, the "positive power" means a lens shape through which incident parallel light converges in a region having an area that is ¼ or more (preferably half or more) of the lens effective region area which includes the center portion of the optical surface. The "negative power" means a lens shape through which incident parallel light diverges in a region having an area that is ¼ or more (preferably half or more) of the lens effective region area which includes the center portion of the optical surface. The "power is present" means a lens shape through which incident parallel light converges or diverges in a region having an area that is ¼ or more (preferably half or more) of the lens effective region area which includes the center portion of the optical surface.

The anamorphic converters 3 in the embodiments 1 to 3 include a first group G1 and a second group G2 in order from the projected-surface side. The first group G1 includes a lens element L11 and has a negative power at least in the main magnification direction. The second group G2 includes a lens element L21 and has a positive power at least in the main magnification direction. As described above, the anamorphic converters 3 in the embodiments 1 to 3 are composed of the two groups and two lenses.

The anamorphic converter 3 in the embodiment 4 includes the first group G1 and the second group G2 in order from the projected-surface side. The first group G1 includes two lens elements L11, L12 and has a negative power at least in the main magnification direction. The second group G2 includes a lens element L21 and has a positive power at least in the main magnification direction. As described above, the anamorphic converter 3 in the embodiment 4 is composed of the two groups and three lenses.

The anamorphic converter 3 in the embodiment 5 includes the first group G1 and the second group G2 in order from the projected-surface side. The first group G1 includes two lens elements L11, L12 and has a negative power at least in the main magnification direction. The second group G2 includes two lens elements L21, L22 and has a positive power at least in the main magnification direction. As described above, the anamorphic converter 3 in the embodiment 5 is composed of the two groups and four lenses.

The anamorphic converter 3 in the embodiment 6 includes the first group G1, the second group G2, a third group G3 and a fourth group G4 in order from the projected-surface side. The first group G1 includes two lens elements L11, L12 and has a negative power at least in the main magnification direction. The second group G2 includes a lens element L21 and has a positive power at least in the main magnification direction. The third group G3 includes two lens element L31, L32 and has a negative power at least in the main magnification direction. The fourth group 64 includes a lens element L41 and has a positive power at least in the main magnification direction. As described above, the anamorphic converter 3 in the embodiment 6 is composed of the four groups and six lenses.

Common Structure in Embodiments 1 to 6

In the anamorphic converters 3 according to the embodiments 1 to 6, of the optical surfaces, the last surface of the first group G1 and the first surface of the second group G2 meet the following conditions. In other words,
[1] the last and first optical surfaces have a power in both main magnification direction and sub-magnification direction.
[2] the last and first optical surfaces are convex toward the projected-surface side in both main magnification direction and sub-magnification direction in a region having an area that is ¼ or more (preferably ½ or more) of the optical effective region area that includes the center portion of the optical surface.
[3] at least one of the last and first optical surfaces is a free curved surface.

Here, assuming that the optical surfaces of the lens elements that constitute the anamorphic converter 3 are respectively S1, S2, ... in order from the projected-surface side, the last surface of the first group G1 is S2 and the first surface of the second group G2 is S3 in the embodiments 1 to 3. In the embodiments 4 to 6, the last surface of the first group G1 is S4 and the first surface of the second group G2 is S5.

As conventional, if an anamorphic converter is composed of a cylindrical lens or a prism, it is impossible to correct a distortion in a direction where the anamorphic converter does not have a power, and a distortion of a projected area is remarkable, especially, on a wide-angle side. However, in the present invention, because the last surface of the first group G1 and the first surface of the second group G2 in the anamorphic converter 3 meet the above condition [1], that is, the last and first optical surfaces have a power in both main magnification direction and sub-magnification direction, it becomes possible to suitably correct a distortion of the projected area in both main magnification direction and sub-magnification direction, especially, a distortion of the projected area on the wide-angle side. Besides, because the last surface of the first group G1 and the first surface of the second group G2 meet the above conditions [2] and [3] at the same time, it becomes possible to suitably correct a distortion of the projected area, while maintaining image-forming performance well.

In addition, by making the last surface of the first group G1 and the first surface of the second group G2 of the plurality of optical surfaces meet the above conditions, an improvement effect in distortion aberration becomes large. Thus, it becomes possible to easily obtain a projected area that has less distortion without using an expensive curved screen.

When the magnification ratio in the main magnification direction is a and the magnification ratio in the sub-magnification direction is b, the anamorphic converter 3 meets the following conditions:

$1.2 \leq a/b \leq 2.0$ and $0.8 \leq b \leq 1.1$

In the case where the above condition is met: $1.2 \leq a/b \leq 2.0$, if the upper limit of the magnification ration b exceeds 1.1 and the magnification ratio a becomes too large, the power of the first group G1 that has a negative power becomes strong, a distortion and a field curvature become large, and unevenness in thickness of the lens element of the first group G1 becomes great. On the other hand, if the magnification ratio b becomes smaller than 0.8, the magnification ratio b is too small and the power of the second group G2 that has a positive power becomes strong, a distortion and a field curvature become large, and unevenness in thickness of the lens element of the second group G2 becomes great. Accordingly, by meeting the above conditions, it becomes possible to correct aberration (distortion and field curvature) and reduce unevenness in thickness of the lens element (chiefly, the first group G1). Especially, if a free curved surface lens that is formed of a resin material is used, the quality of the lens element becomes stable because of improvement in formation performance due to the reduction in uneven thickness. As a result of this, it is possible to achieve the anamorphic converter 3 that is highly reliable by using a high-quality lens element.

It is desirable that the anamorphic converter 3 further meets the following condition:

$0.9 \leq b \leq 1.0$

If this condition is met, it is possible to surely carry out the above aberration correction and reduction in uneven thickness of the lens elements. Besides, if a free curved surface lens that is formed of, especially, a resin material is used, it is possible to surely obtain the above effect due to the reduction in uneven thickness.

It is desirable that when the conditions are met, that is, $1.2 \leq a/b \leq 2.0$ and $0.8 \leq b \leq 1.1$ (or $0.9 \leq b \leq 1.0$), the following conditions are met: in other words, if the last surface of the first group G1 of the anamorphic converter 3 is a free curved surface and the shape of the free curved surface is represented by a numerical expression described later, it is desirable that the following condition is met:

$0 < c(2,0)/c(0,2) \leq 0.4$; and it is further desirable that the following condition is met:

$0.1 < c(2,0)/c(0,2) \leq 0.4$

Besides, if the first surface of the second group G2 of the anamorphic converter 3 is a free curved surface and the shape of the free curved surface is represented by a numerical expression described later, it is desirable that the following condition is met:

$0 < c(2,0)/c(0,2) \leq 1.0$; and it is further desirable that the following condition is met:

$$0.4 < c(2,0)/c(0,2) \leq 1.0$$

Here, the foregoing conditions may be met separately or at the same time.

Here, a free curved surface is defined by the following numerical expression that uses a local rectangular-coordinates system (x, y, z) which has a surface vertex as the origin. Here, the optical-axis direction is the x direction, the main magnification direction is the z direction, and the sub-magnification direction is the y direction.

$$x = \frac{ch^2}{1 + \sqrt{1-(1+k)c^2h^2}} + \sum\sum c(i,j)y^i z^j$$

where
- x: the displacement amount in the optical-axis direction at a height h (the surface vertex is the reference).
- h: the height ($h^2 = y^2 + z^2$) in a direction perpendicular to the optical axis (x axis).
- c: the paraxial curvature (=1/a radius of curvature).
- k: the conic coefficient.
- c (i, j): the free curved surface coefficient at the i degree of y and the j degree of z.

If the value of c(2, 0)/c(0, 2) becomes smaller than the lower limit in each of the foregoing conditional expressions, a spool-shaped distortion (a pin-cushion distortion) becomes large, and if the value of c(2, 0)/c(0, 2) exceeds the upper limit in each of the foregoing conditional expressions, the distortion correction becomes excessive and a barrel distortion appears. Accordingly, it is possible to suitably curb a distortion of a projected area by meeting the foregoing conditional expressions.

The lens elements that are disposed in the groups of the first group G1 to the last group (the second group G2 or the fourth group G4) of the anamorphic converter 3 are formed of a resin material. As such material, there is, for example, an acrylic resin and a cycloolefin polymer resin (e.g., ZEONEX; a registered trademark in Japan). These resin materials are suitable for formation of a free curved surface lens and are able to improve the formation performance. Accordingly, it is possible to surely achieve a high-quality lens element and a highly reliable anamorphic converter 3.

Common Structure in Embodiments 4 to 6

The anamorphic converters 3 in the embodiments 4 to 6 include at lease one set of optical surfaces that have the same shape. More specifically, the anamorphic converter 3 in the embodiment 4 includes two sets of optical surfaces which have the same shape, that is, S1 and S3, and S2 and S4. The anamorphic converter 3 in the embodiment 5 includes four sets of optical surfaces which have the same surface, that is, S1 and S3, S2 and S4, S5 and S7, and S6 and S8. The anamorphic converter 3 in the embodiment 6 includes six sets of optical surfaces which have the same surface, that is, S1 and S3, 82 and S4, S7 and S9, S8 and S10, S5 and S11, and S6 and S12.

As described above, because the anamorphic converter 3 includes at least one set of optical surfaces that have the same shape, for example, it becomes possible to compose the anamorphic converter 3 by using at least one set of the same lens elements. Accordingly, it becomes possible to reduce cost compared with a case where all the shapes of optical surfaces are made different by using different lens elements. Especially, in a case where a free curved surface lens that is formed of a resin material is used, because the cost for a mold that is used to form the resin material into a shape can be reduced, the effect of cost reduction becomes large.

In the anamorphic converter 3, at least one of the first group G1 and the second group C2 is composed of two or more lens elements. Specifically, in the anamorphic converters 3 in the embodiments 4 and 6, the first group G1 is composed of two lens elements L11 and L12. In the anamorphic converter 3 in the embodiment 5, the first group G1 is composed of two lens elements L11 and L12, and the second group G2 also is composed of two lens elements L21 and L22.

As described above, it is possible to achieve further reduction in aberration and reduce unevenness in thickness of the lens elements by increasing the number of lenses in at least one of the first group G1 and the second group G2. Especially, in a case where a free curved surface lens that is formed of a resin material is used, because of improved formation performance due to reduction in uneven thickness, the quality of the lens element becomes stable and it is possible to achieve a highly reliable anamorphic converter 3.

Besides, the anamorphic converter 3 includes at least one set of the same lens elements. Specifically, the anamorphic converter 3 in the embodiment 4 includes one set of the same lens elements (the lens elements L11 and L12). The anamorphic converter 3 in the embodiment 5 includes two sets of the same lens elements (the lens elements L11 and L12, and L21 and L22). The anamorphic converter 3 in the embodiment 6 includes three sets of the same lens elements (the lens elements L11 and L12, L31 and L32, and L21 and L41).

As described above, because the anamorphic converter 3 is composed of at least one set of the same lens elements, it is possible to surely obtain the effect of cost reduction. Generally, although error in production of a lens element often has a similar tendency among lenses (the error direction is often the same), because influence due to such production error on the performance can be corrected by, for example, mounting the lens upside down in the time of assembly, it is possible to achieve a higher-quality anamorphic converter 3.

Unique Structure to Embodiment 6

As described above, the anamorphic converter 3 in the embodiment 6 is composed of the four groups of the first group G1 to the fourth group 64, and the four groups of the first group G1 to the fourth group G4 are disposed in order from the projected-surface side. Thus, for example, it becomes possible to separately compose the optical system that includes the first group G1 and the second group G2 and the optical system that includes the third group G3 and the fourth group G4, and also possible to arrange the optical systems rotatably relatively with each other. In the former case, it becomes possible to achieve two different magnification ratios, and in the latter case, it becomes possible to achieve a wide converter. The structures are described in detail later. Because the number of lenses is increased by composing the anamorphic converter 3 with the four groups, it is possible to reduce aberration and unevenness in thickness of the lens elements like in the above description. Especially, in a case where a free curved surface lens that is formed of a resin material is used, because of the stable quality of the lens element it possible to achieve a highly reliable anamorphic converter 3.

In the anamorphic converter 3 described above, both of one set of the first group G1 and the third group G3 and the other set of the second group G2 and the fourth group G4 have the same group structure. Specifically, the first group G1 and the third group G3 have the same group structure that includes the same lens elements, and the second group G2 and the fourth group G4 have the same group structure that includes the same lens elements.

In the anamorphic converter 3 having the four-group structure, by using the same group structure for the plurality of groups, it is possible to achieve a large cost reduction compared with the use of different group structures. Besides, because at least one set of the same lens elements is included, like in the above description, influence due to production error of each lens element on the performance is cancelled by the plurality of lens elements, thereby it is possible to achieve a higher-quality anamorphic converter 3. It is possible to obtain these effects if at least one of the sets, that is, the first group G1 and the third group G3, and the second group G2 and the fourth group G4 has the same group structure.

<Focus Adjustment>

In the anamorphic converters 3 according to the embodiments 1 to 6, the distance between the group that has a negative power at least in the main magnification direction and the group which has an ordinal number higher by only 1 than the group having the negative power is able to be varied according to a projection condition. More specifically, in the anamorphic converters 3 according to the embodiments 1 to 3, the distance (the distance between S2 and S3) between the first group G1 and the second group G2 is adjustable. In the anamorphic converters 3 according to the embodiments 4 and 5, the distance (the distance between S4 and S5) between the first group G1 and the second group G2 is adjustable. In the anamorphic converters 3 according to the embodiment 6, at least one of the distances, that is, the distance (the distance between S4 and S5) between the first group G1 and the second group G2, and the distance (the distance between S10 and S11) between the third group G3 and the fourth group 4 is adjustable. Such adjustment of the group distance (surface distance) is able to be carried out by employing, for example, an adjustment mechanism represented below.

Figure 13:
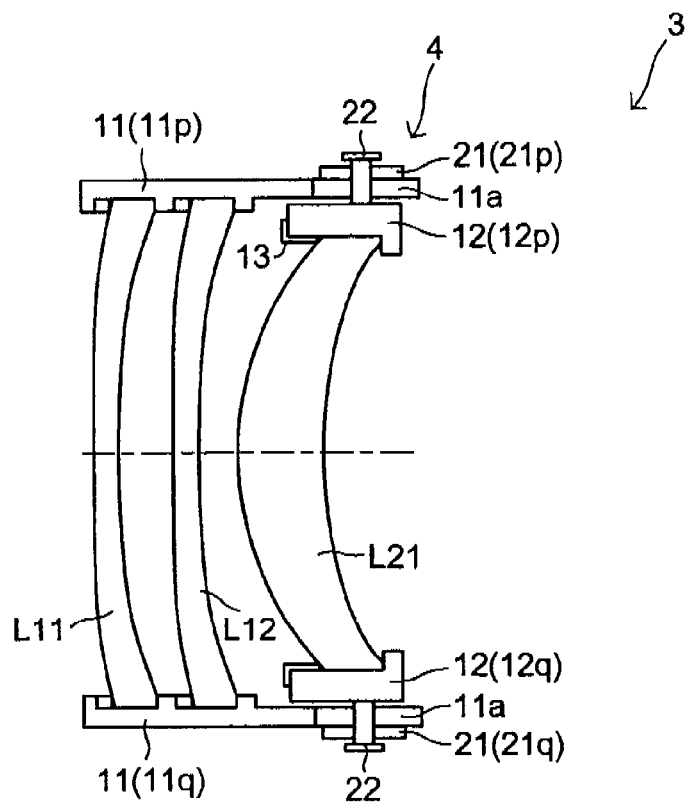
FIG. 13 is a sectional view along a sub-magnification direction that shows a schematic structure of an adjustment mechanism of an anamorphic converter of the image projection system according to the embodiment 4.
Figure 14:
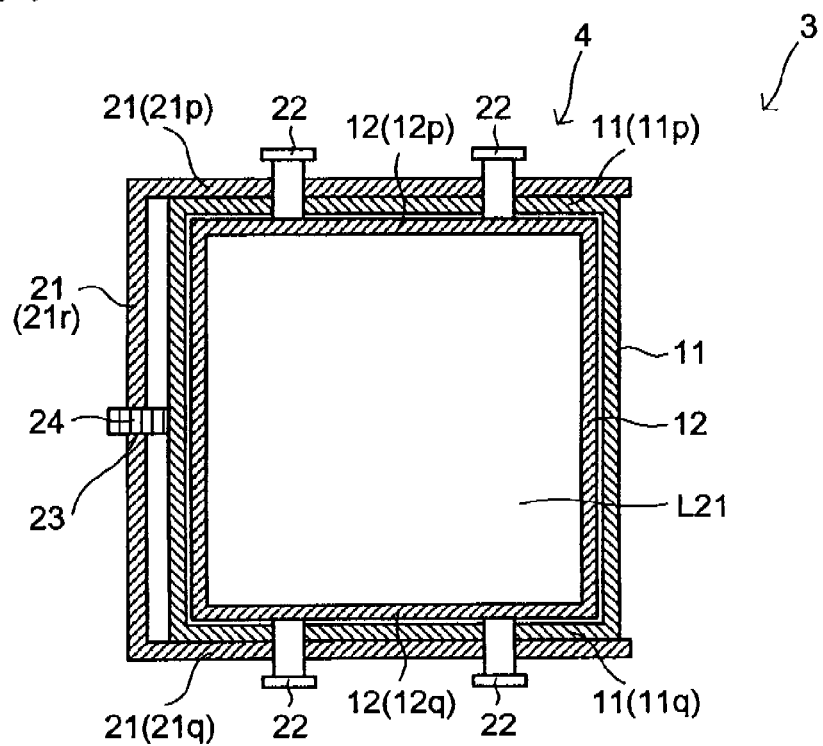
FIG. 14 is a sectional view perpendicular to an optical axis of the adjustment mechanism.

FIG. 13 is a sectional view along the sub-magnification direction that shows, for example, a schematic structure of an adjustment mechanism 4 in the anamorphic converter 3 according to the embodiment 4. FIG. 14 is a sectional view perpendicular to the optical axis of the adjustment mechanism 4. In FIG. 14, of the plurality of lens elements, only the lens element L21 of the second group G2 is shown for convenience. Besides, FIGS. 15A, 15B and 15C respectively show both of a plan view and a sectional view of the adjustment mechanism 4 that corresponds to different lens positions in the second group G2.

Here, each lens element of the anamorphic converter 3 is formed into a rectangular shape when seen from the optical-axis direction (see FIG. 14). This structure is employed to reduce the entire anamorphic converter 3 in size by removing the waste regions where light does not pass through because the region of each lens element through which light passes is a substantially rectangular shape in the anamorphic converter 3 that is disposed near the projected-surface side of the projection lens 2.

In the anamorphic converter 3, the lens elements L11 and L12 of the first group G1 are fixed to a stationary lens barrel 11. The lens element L21 of the second group G2 is fixed to a lens frame 12 with a washer 13. The stationary lens barrel 11 is provided with straight grooves 11a parallel with the optical axis. The two straight grooves 11a are formed in each of an upper-surface portion 11p and a lower-surface portion 11q of the stationary lens barrel 11a predetermined distance away from each other in a horizontal direction.

The adjustment mechanism 4 includes a cam plate 21 and a pin 22. The cam plate 21 is formed of a metal plate that is bent into a substantially U shape along the outer surface of the stationary lens barrel 11, and may be formed of a resin material. The cam plate 21 is provided with lead grooves 21a in a direction inclined toward the optical axis. The two lead grooves 21a are formed in each of surfaces (hereinafter, called an upper-surface portion 21p and a lower-surface portion 21q) respectively facing the upper-surface portion 11p and the lower-surface portion 11q a predetermined distance away from each other in a horizontal direction.

Besides, a female-screw portion 23 is formed through a substantially central portion of a side portion 21r that connects the upper-surface portion 21p and the lower-surface portion 21q of the cam plate 21. The male-screw portion 24 is screwed through the female-screw portion 23 so that the tip end of the male-screw portion 24 comes into contact with the stationary lens barrel 11. The cam plate 21 is forced by a forcing member (e.g., a spring), not sown, in a direction perpendicular to the optical axis and toward the optical axis from the side portion 21r. Accordingly, the gap between the side portion 21r and the stationary lens barrel 11 is adjusted by manually or electrically rotating and moving the male-screw portion 24 back and forth. In other words, it becomes possible to move the entire cam plate 21 in a horizontal direction.

The pins 22 are so formed as to protrude from the lens frame 12 in a vertical direction, and two pins 22 are formed on each of an upper-surface portion 12p and a lower-surface portion 12q of the lens frame 12 a predetermined distance away from each other in a horizontal direction. Each pin 22 penetrates through the straight groove 11a formed in the stationary lens barrel 11 and the lead groove 21a formed in the cam plate 21. Consequently, the lens element L21 held by the lens frame 12 becomes movable in the optical-axis direction along the straight groove 11a. And the position of the lens element L21 in a plane perpendicular to the optical axis is determined.

Because the lead groove 21a is inclined toward the optical axis and the straight groove 11a is formed parallel with the optical axis, the pin 22 is guided by the lead groove 21a and the straight groove 11a and moved in the optical-axis direction by sliding the cam plate 21 in a horizontal direction. Thus, the position of the lens element L21 fixed to the lens frame 12 that is unitary with the pin 22 changes in the optical-axis direction, and it becomes possible to adjust the gap between the first group G1 and the second group G2. For example, if the cam plate 21 is slid in a left direction in a state shown in FIG. 15B, as shown in FIG. 15A, the lens element L21 moves toward the projected-surface side together with the lens frame 12. On the other hand, if the cam plate 21 is slid in a right direction in the state shown in FIG. 15B, as shown in FIG. 15C, the lens element L21 moves toward the projection lens 2 together with the lens frame 12.

The adjustment mechanism 4 is employed and, for example, in a case where one of many kinds of lenses that are different from each other in focal length (field angle) or a high-magnification zoom lens is used as the projection lens 2, the group distances (the distance between the first group G1 and the second group G2, the distance between the third group G3 and the fourth group G4) are made variable according to various projection conditions; thus, aberration (e.g., astigmatism) for each projection condition is corrected well and it becomes possible to maintain a good image-forming performance. In other words, it is possible to correct astigmatism that is caused by zooming or appears when a different lens is mounted.

Because the group distance is variable, it is possible to adjust the focus with the anamorphic converter 3 instead of adjusting the focus with the employed projection lens 2. In other words, even if the anamorphic converter 3 is moved in and out of the optical path, it is possible to adjust the focus with the anamorphic converter 3, so that the focal position on the projected surface does not change. Accordingly, it is unnecessary to take the trouble to adjust the projection lens 2 every time the anamorphic converter 3 is moved in and out.

In the foregoing description, although an example of moving the second group G2 with the adjustment mechanism 4 is described, the first group G1 may be moved. In the embodiments 1 to 3, if the first group 2p1 is moved, the distance from the projected surface to the first surface (S1) of the anamorphic converter 3 changes, and if the second group C2 is moved, the distance from the fourth surface (S4) of the anamorphic converter 3 to the first surface of the projection lens 2 changes. In the embodiment 4, if the first group G1 is moved, the distance from the projected surface to the first surface (S1) of the anamorphic converter 3 changes, and if the second group G2 is moved, the distance from the sixth surface (S6) of the anamorphic converter 3 to the first surface of the projection lens 2 changes. In the embodiment 5, if the first group G1 is moved, the distance from the projected surface to the first surface (S1) of the anamorphic converter 3 changes, and if the second group C2 is moved, the distance from the eighth surface (SS) of the anamorphic converter 3 to the first surface of the projection lens 2 changes.

In the embodiment 6, any one of the first group G1 to the fourth group 4 may be moved. For example, if the first group G1 is moved, the distance from the projected surface to the first surface (S1) of the anamorphic converter 3 changes, and if the fourth group G4 is moved, the distance from the twelfth surface (S12) of the anamorphic converter 3 to the first surface of the projection lens 2 changes.

Lens Barrel Structure 1 in Embodiment 6

In the anamorphic converter 3 according to the embodiment 6, if the optical system composed of the third group G3 and the fourth group 64 functions as an anamorphic converter, the optical system composed of the first group G1 and the second group G2 and the optical system composed of the third group G3 and the fourth group G4 may be structured separably from each other.

Figure 16:
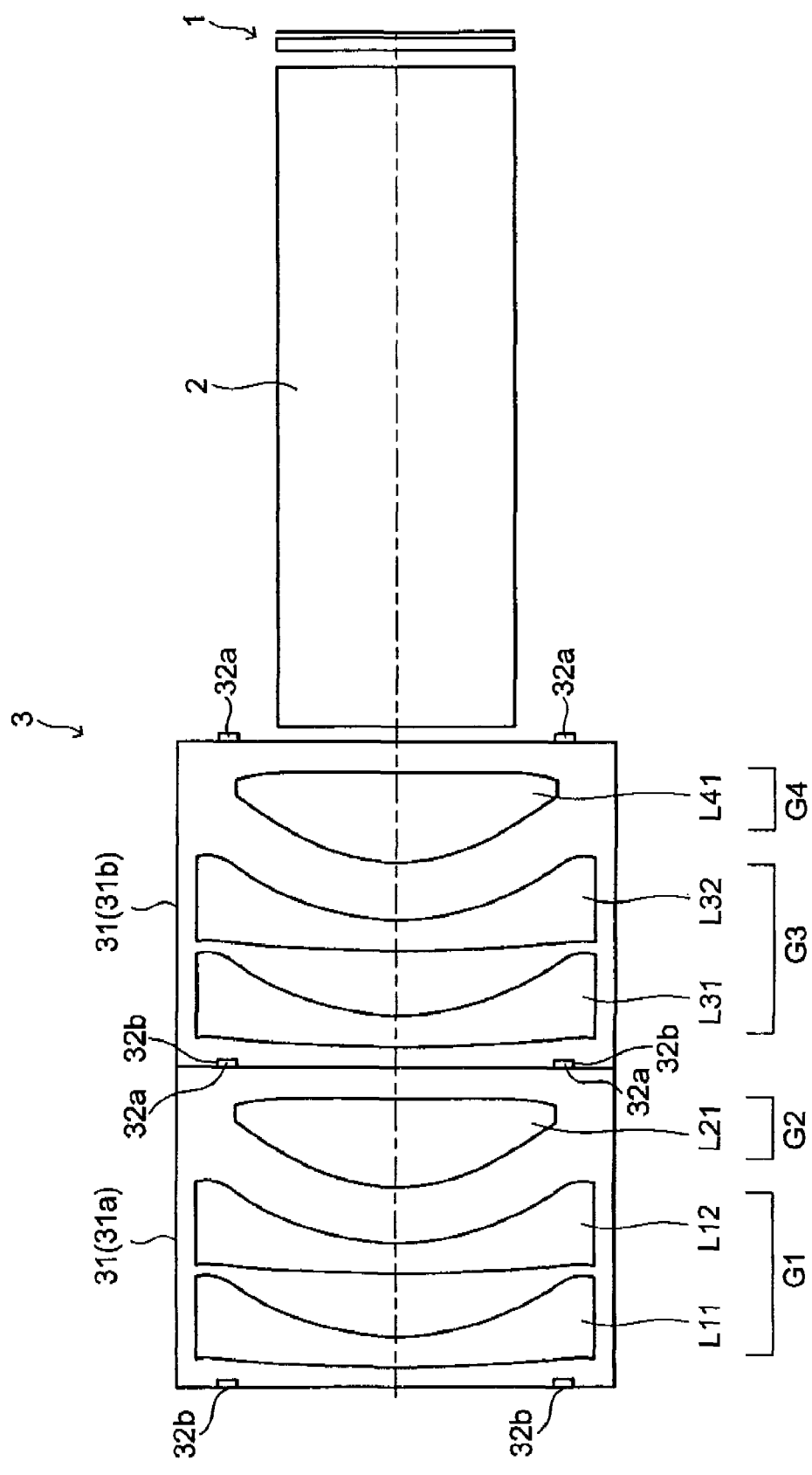
FIG. 16 is a sectional view showing a structure of a lens barrel of an anamorphic converter of the image projection system according to the embodiment 6.

For example, FIG. 16 is a sectional view showing a structure of a lens barrel 31 of the anamorphic converter 3 in the embodiment 6. The lens barrel 31 is composed of a lens barrel 31a for holding the first group G1 and the second group G2 and a lens barrel 31b for holding the third group 63 and the fourth group G4. The lens barrels 31a and 31b have exactly the same structure. Protrusion portions 32a are formed on a side of each of the lens barrels 31a and 31b that faces the projection lens 2, and fit-in portions 32 into which the protrusion portions 32a of the other lens barrel fit are formed on a side of each of the lens barrels 31a and 31b that faces the projected surface. Accordingly, it becomes possible to connect and separate the lens barrels 31a and 31b by fitting and pulling out the protrusion portions 32a of the lens barrel 31a into and from the fit-in portions 32b of the lens barrel 31b.

As described above, the lens barrel 31 is provided with connection mechanisms (the protrusion 32a and the fit-in portion 32b), so that the optical system composed of the first group G1 and the second group G2 and the optical system composed of the third group G3 and the fourth group G4 are separable from each other, thereby it is possible to achieve an anamorphic converter 3 that has two different magnification ratios depending on the states in which these optical systems are separated or not. For example, if only the optical system composed of the third group G3 and the fourth group G4 is mounted on the projection lens 2, the anamorphic converter 3 is able to be used as an anamorphic converter that has a magnification ratio of 1.32, and if both optical systems are connected to each other, the anamorphic converter 3 is able to be used as an anamorphic converter that has a magnification ratio of 1.75.

Lens Barrel Structure 2 in Embodiment 6

In the anamorphic converter 3 according to the embodiment 6, if the optical system composed of the third group G3 and the fourth group G4 functions as an anamorphic converter, the optical system composed of the first group G1 and the second group G2 and the optical system composed of the third group G3 and the fourth group G4 may be structured rotatably relatively with each other.

Figure 17:
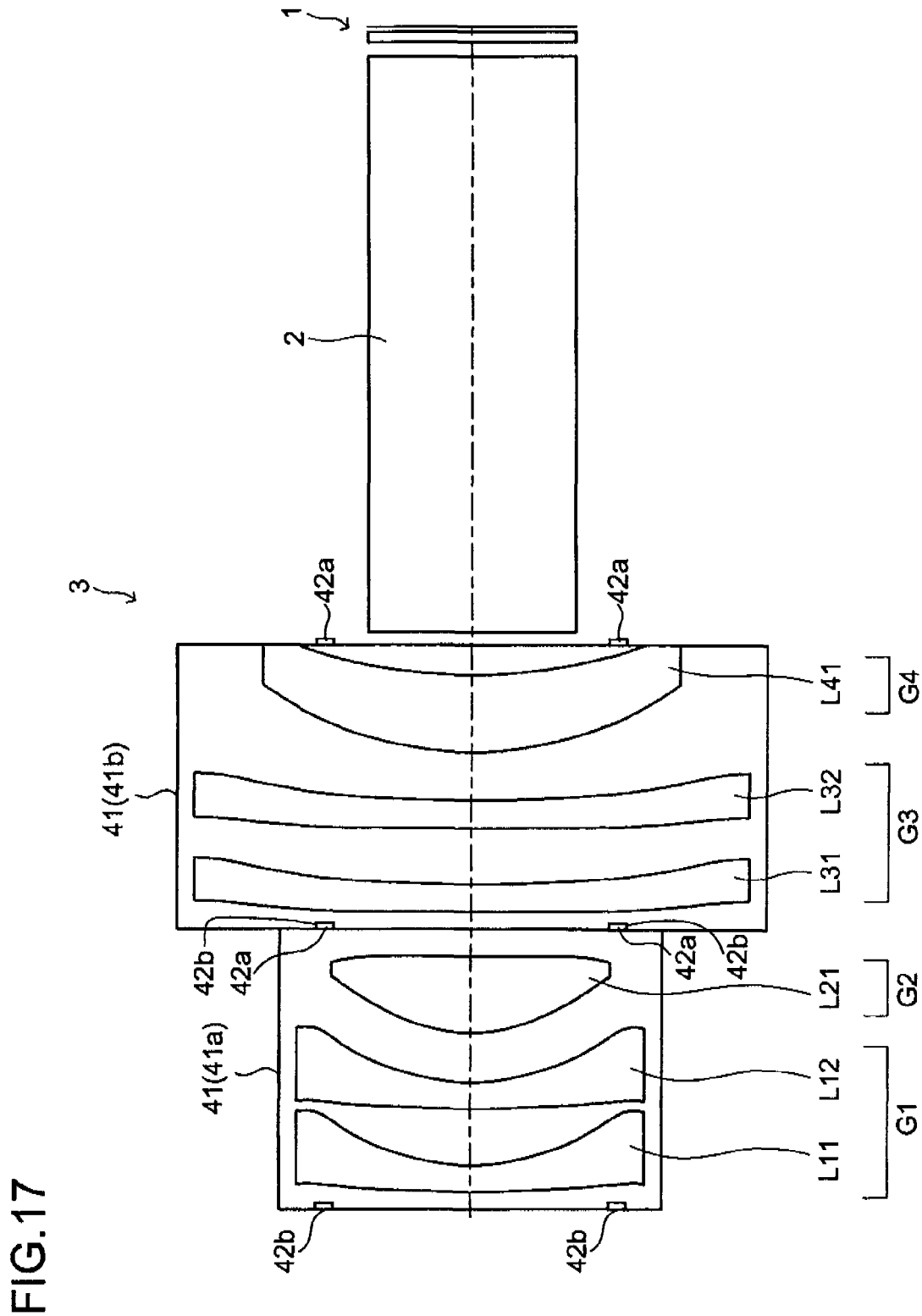
FIG. 17 is a sectional view showing another structural example of the lens barrel.

For example, FIG. 17 is a sectional view showing a structure of a lens barrel 41 of the anamorphic converter 3 in the embodiment 6. The lens barrel 41 is composed of a lens barrel 41a for holding the first group G1 and the second group G2 and a lens barrel 41b for holding the third group G3 and the fourth group G4. The lens barrels 41a and 41b have exactly the same structure. FIG. 17 shows a state in which the lens barrel 41b is connected to the lens barrel 41a with the lens barrel 41b rotated by 90° around the optical axis with respect to the lens barrel 41a. A plurality of protrusion portions 42a (e.g., four positions) are formed at equal intervals around the optical axis on a side of each of the lens barrels 41a and 41b that faces the projection lens 2, and a plurality of fit-in portions 42b (e.g., four positions) into which the protrusion portions 42a of the other lens barrel fit are formed at equal intervals around the optical axis on a side of each of the lens barrels 41a and 41b that faces the projected surface.

If necessary, it is possible to change the way of connecting the lens barrel 41a and the lens barrel 41b to each other by using the structure of the lens barrels 41a and 41b. Specifically, a way of connecting the lens barrels 41a and 41b is possible, in which the protrusion portions 42a of the lens barrel 41a are fitted into the fit-in portions 42b of the lens barrel 41b in order to align the main magnification direction of the optical system composed of the first group G1 and the second group G2 with the main magnification direction of the optical system composed of the third group G3 and the fourth group G4; the lens barrels 41a and 41b are separated from each other; then the lens barrel 41b is rotated by 90° around the optical axis; the protrusion portions 42a of the lens barrel 41a are again fitted into the fit-in portions 42b of the lens barrel 41b, so that both lens barrels 41a and 41b are connected to each other (see FIG. 17).

As described above, it is possible to achieve a wide converter by rotating the main magnification direction of one of both optical systems 90° with respect to the main magnification direction of the other of both optical systems. In other words, it also becomes possible to use the anamorphic converter 3 according to the present invention as a wide converter.

As a connection mechanism between the lens barrel 41a and the lens barrel 41b, besides the connection mechanism composed of the protrusion portions 42a and the fit-in portions 42b described above, also possible is another connection mechanism which allows one of the lens barrels 41a and 41b to be rotated relatively with respect to the other with both lens barrels 41a and 41b connected to each other. In FIG. 17, the lens barrel 41b is connected to the lens barrel 41a with the lens barrel 41*b* rotated around the optical axis; however, the lens barrel 41*a* may be connected to the lens barrel 41*b* with the lens barrel 41*a* rotated around the optical axis.

If a plurality (e.g., four positions) of the protrusion portions 32*a* and the fit-in portions 32*b* of the lens barrels 31*a* and 31*b* shown in FIG. 16 are formed at equal intervals around the optical axis, it is possible to form the lens barrels 41*a* and 41*b* shown in FIG. 17. In this case, it is possible to structure the optical system composed of the first group G1 and the second group G2 and the optical system composed of the third group G3 and the fourth group G4 separably from and rotatably relatively with each other.

3. POSITIONAL RELATIONSHIP AND CONDITIONAL EXPRESSION (FORMULA) AMONG CONSTITUENT ELEMENTS IN IMAGE PROJECTION SYSTEM

In the image projection systems in the embodiments 1 to 6 described above, the constituent elements (the display device 1, the projection lens 2 and the anamorphic converter 3) are so arranged as to allow the center of the display surface of the display device 1, the optical axis of the projection lens 2 and the optical axis of the anamorphic converter 3 to be aligned with each other. However, the positional relationship between these constituent elements is not limited to this relationship.

Figure 18A:
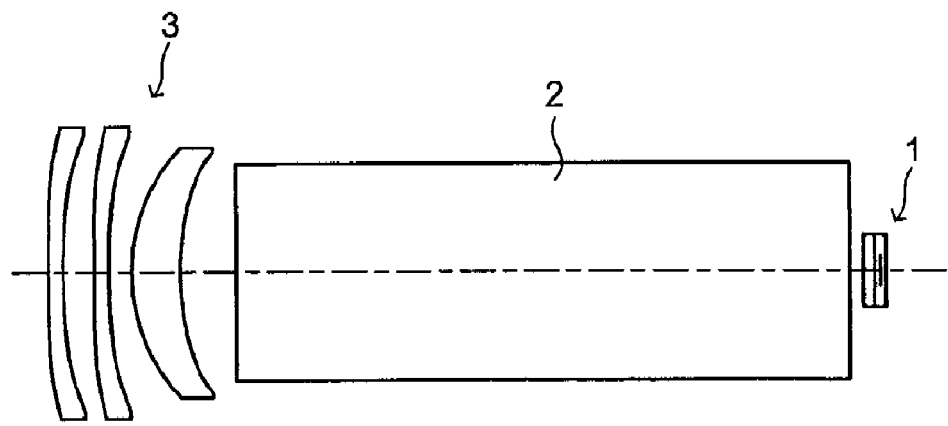
FIGS. 18A, 18B and 18C are sectional views along a sub-magnification direction, each of which shows a positional relationship between constituent components of an image projection system.
Figure 18B:
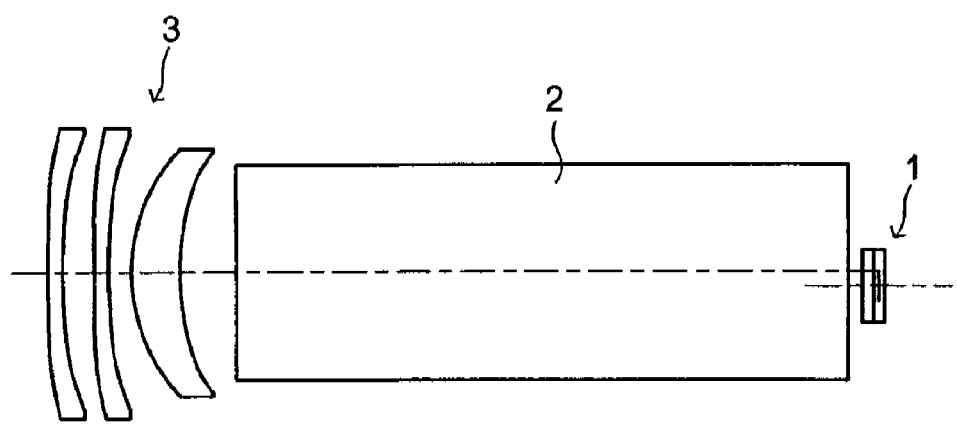
Figure 18C:
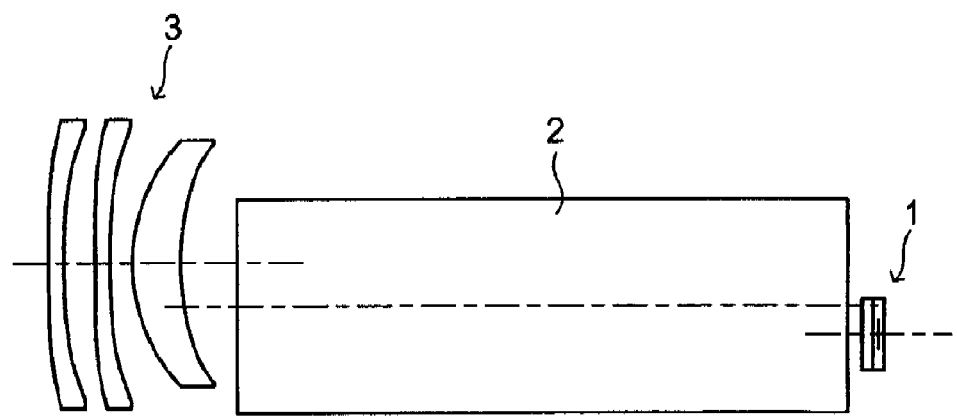

FIGS. 18A, 18B and 18C are sectional views along the sub-magnification direction which respectively show a positional relationship between constituent elements of, for example, the image projection system in the embodiment 4. More specifically, FIG. 18A shows a state in which the constituent elements are so arranged as to allow the center of the display surface of the display device 1 and the optical axes of the projection lens 2 and the anamorphic converter 3 to be aligned with each other. FIG. 18B shows a state in which the projection lens 2 and the anamorphic converter 3 are so arranged as to allow the optical axes of the projection lens 2 and the anamorphic converter 3 to be aligned with each other, and the display device 1 is so arranged as to allow the center of the display surface to deviate from the above optical axis in the sub-magnification direction. FIG. 18C shows a state in which the projection lens 2 and the anamorphic converter 3 are so arranged as to allow the optical axes of the projection lens 2 and the anamorphic converter 3 to deviate from each other in the sub-magnification direction, and the display device 1 is so arranged as to allow the center of the display surface to deviate from each of the above optical axes of the projection lens 2 and the anamorphic converter 3 in the sub-magnification direction. Here, the shift amount of the display device 1 from the optical axis in the sub-magnification direction is equal to the distance between the center of the display surface and the upper end of the display surface in FIG. 18B, and is twice the above distance in FIG. 18C.

Here, the display surface of the display device 1 means a region on which an image is actually displayed, and the center of the display surface means the center of a region on which an image is actually displayed. Accordingly, it is possible to achieve a positional relationship in which the center of the display surface and the optical axis are deviated from each other by deviating relatively the projection lens 2 and the display device 1 from each other in the vertical direction (the sub-magnification direction) with respect to the optical axis and by displaying an image on the entire display surface, or it is also possible by displaying an image on part (e.g, an upper half or a lower half) of the display surface without deviating relatively the projection lens 2 and the display device 1.

Even if the image projection system is formed into any structure shown in FIGS. 18A, 18B and 18C, by composing the anamorphic converter 3 as described above, it is possible to obtain the above effect of the present invention of correcting a distortion of a projected area and other effects while maintaining image-forming performance well without using an expensive curved screen.

In the state where the anamorphic converter 3 is inserted into the optical path, the projection position hardly changes even if the anamorphic converter 3 is moved with respect to the projection lens 2. However, it is possible to reduce the influence of aberration caused by the anamorphic converter 3 by aligning the optical axis of the projection lens 2 with the optical axis of the anamorphic converter 3 as shown in FIG. 18A and FIG. 18B. In other words, although a large deterioration due to aberration does not occur even if the optical axis of the projection lens 2 and the optical axis of the anamorphic converter 3 are deviated from each other as shown in FIG. 18C, it is possible to curb a slight deterioration by aligning both optical axes with each other as shown in FIGS. 18A and 18B. On the other hand, as shown in FIG. 18C, if the optical axis of the projection lens 2 is not aligned with the optical axis of the anamorphic converter 3, there is an effect that the anamorphic converter 3 is able to be reduced in size in the radial direction.

Besides, it is possible to curb a trapezoidal distortion of the projected area by deviating the optical axis of the projection lens 2 and the center of the display device 1 from each other as shown in FIGS. 18B and 18C compared with a structure in which an image is obliquely projected onto a screen by aligning the optical axis of the projection lens 2 and the center of the display device 1 with each other, so that an excellent projected area (similar to a rectangular shape) is able to be obtained. Accordingly, the degree of freedom for disposing the image projection system also increases. Specifically, even if the image projection system is disposed on the ceiling of a room and an image is obliquely projected on a screen, the user is able to enjoy a good image with less distortion.

Figure 19:
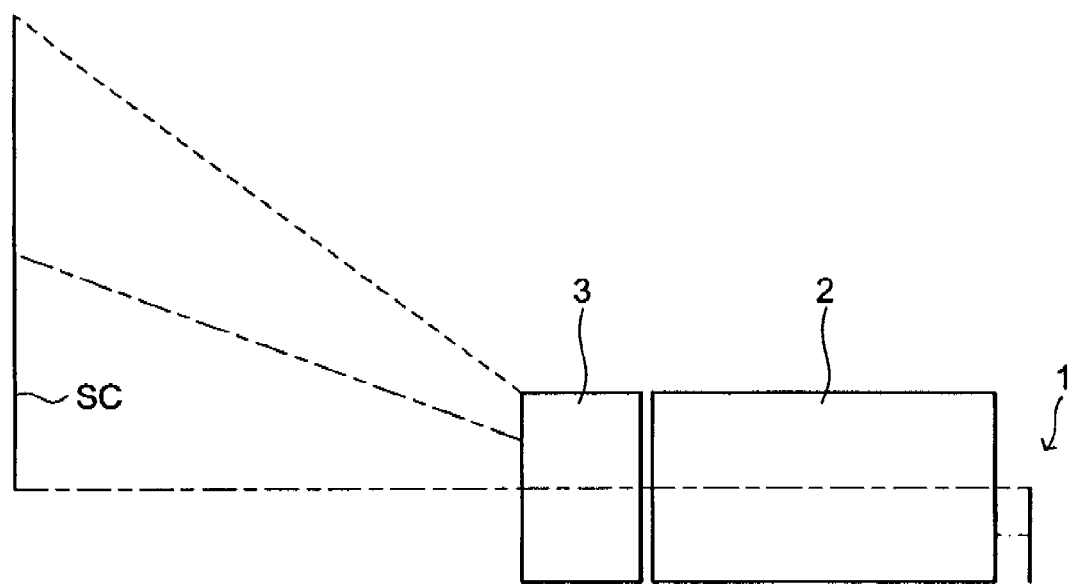
FIG. 19 is a sectional view along a sub-magnification direction of an image projection system that shifts a display device from optical axes of a projection lens and an anamorphic converter and projects an image.

FIG. 19 is a sectional view along the sub-magnification direction of an image projection system that projects an image displayed on the display device 1 to a screen SC, that is, a projected surface with the upper end or the lower end of the display surface of the display device 1 and the optical axes of the projection lens 2 and the anamorphic converter 3 aligned with each other. In this image projection system, it is desirable that the following conditional expressions are met:

when $\Delta V \neq 0$, $$(\Delta H/\Delta V)<0.275 \text{ and } -0.01<\Delta H<+0.01$$

when $\Delta V=0$, $$-0.01<\Delta H<+0.01$$

where $$\Delta H=(H\text{corner}/H_0)-1$$

$$\Delta V=(V\text{corner}/V_0)-1$$

Hcorner: the length (mm) between the corners of a projected area in the main magnification direction.

$H_0$: the length (mm) of the projected area along the line which runs through the center of the projected area in the main magnification direction.

Vcorner: the length (mm) between the corners of the projected area in the sub-magnification direction.

$V_0$: the length (mm) of the projected area along the line which runs through the center of the projected area in the sub-magnification direction.

Figure 20:
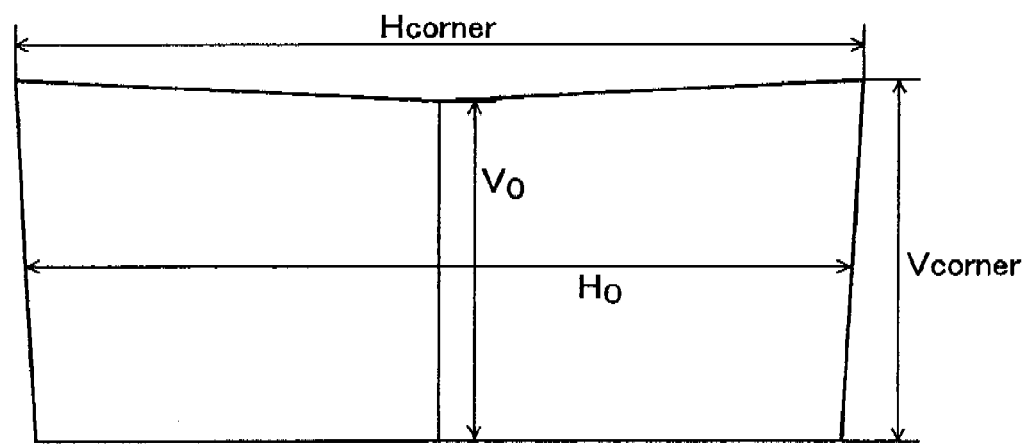
FIG. 20 is a view to explain each parameter of a projected area onto which an image is projected by the image projection system.

FIG. 20 shows the foregoing parameters (Hcorner, $H_0$, Vcorner, and $V_0$) in the projected area.

The foregoing conditional expressions define the conditions in order to obtain a high-quality projection image with less distortion (distortion aberration) in the image projection system that has the structure shown in FIG. 19. Specifically, when $\Delta V>0$, if the foregoing conditional expressions are not met, the projection image becomes an image that has a large spool-shaped distortion. In the conventional anamorphic converter that is composed of a cylindrical lens and the like, generally, $\Delta H/\Delta V$ becomes 0.4 to 0.5. When $\Delta V<0$, if the foregoing conditional expressions are not met, the projection image becomes an image that has a large barrel distortion. On the other hand, when $\Delta V=0$, if the foregoing conditional expressions are not met, the projection image becomes an image that has a large spool-shaped distortion or a barrel distortion in only the main magnification direction.

Accordingly, when the foregoing conditional expressions are met it is possible to obtain a projection image that has less distortion and a high quality. Especially, it is possible to obtain a high-quality projection image that is curbed small in distortion in a longitudinal line which cannot be curbed in a curved screen, and a projection image having less distortion is able to be obtained without using an expensive curved screen.

4. EXAMPLES

Hereinafter, examples of the image projection systems in the embodiments 1 to 6 are specifically described as examples 1 to 6 using construction data and the like. The examples 1 to 6 are numerical examples that respectively correspond to the embodiments 1 to 6, and the optical structure views and the optical path views (FIGS. 1 to 12) for the embodiments 1 to 6 are applied to the corresponding examples 1 to 6 as they are.

In the construction data represented below, Si (i=1, 2, 3, ...) indicates the i-th surface from the projected-surface side. Besides, d indicates the surface distance (mm) on the axis between the surface Si and the surface S (i+1), and nd and vd indicate the refractive index and the Abbe's number respectively for the d ray.

Although the surface Si composed of a free curved surface is defined by the above-described expression, because the spherical-surface term (the first term) is regarded 0 here, the representation of the paraxial radius of curvature in the construction data is omitted. If the paraxial radius of curvature is represented, it is $\infty$ (c=0). Besides, in the free curved surface, all the coefficients of terms that are not represented are 0, and $E-n = \times 10^{-n}$ for all the data.

In addition, hereinafter, for each embodiment, the focal distance (mm) of the projection lens 2 and the size (mm×mm) of the display surface of the display device 1 also are represented as data for a mounted optical system in which the anamorphic converter 3 is mounted. Especially, in the examples 4 and 5, data for three sets of mounted optical systems are represented.

Example 1

| Si | d | nd | vd |
|---|---|---|---|
| 1 | 7.000 | 1.49473 | 57.49 |
| 2 | 19.236 to 16.932 | | |
| 3 | 20.508 | 1.49473 | 57.49 |
| 4 | 27.649 | | |

Projection-Lens First Surface
(Free Curved Surface Data)

TABLE 1

| | | | S1 | | | |
|---|---|---|---|---|---|---|
| | | | j | | | |
| i | 0 | 2 | 4 | 6 | 8 | 10 |
| 0 | | −1.943344E−03 | −1.257815E−07 | −1.290546E−10 | 7.190680E−14 | 1.586722E−17 |
| 2 | 9.925763E−04 | 3.856918E−07 | −1.184835E−11 | −4.222214E−14 | 1.232706E−17 | |
| 4 | 5.640731E−08 | −3.130273E−11 | 1.296605E−13 | −1.552810E−17 | | |
| 6 | 2.724290E−11 | 3.934338E−14 | −2.105151E−17 | | | |
| 8 | −1.767654E−15 | −8.388042E−18 | | | | |
| 10 | 3.526443E−19 | | | | | |

TABLE 2

| | | | S2 | | | |
|---|---|---|---|---|---|---|
| | | | j | | | |
| i | 0 | 2 | 4 | 6 | 8 | 10 |
| 0 | | 1.132826E−02 | −3.895234E−07 | 4.241631E−10 | −4.019656E−14 | 6.037693E−17 |
| 2 | 4.060078E−03 | −8.923110E−07 | 8.178567E−10 | −1.645730E−14 | 1.582226E−16 | |
| 4 | −7.017507E−07 | 6.540067E−10 | −1.746817E−14 | 2.796974E−16 | | |
| 6 | 1.997841E−10 | −2.747695E−14 | 1.695728E−16 | | | |
| 8 | −2.858421E−14 | −6.236075E−18 | | | | |
| 10 | 6.400121E−18 | | | | | |

TABLE 3

S3

| i | 0 | 2 | 4 | 6 | 8 | 10 |
|---|---|---|---|---|---|----|
| 0 |  | 6.866045E−03 | −7.525939E−07 | 3.216253E−10 | −9.606849E−14 | −3.506641E−16 |
| 2 | 6.572841E−03 | −1.403319E−06 | 4.071477E−10 | 7.424190E−15 | 2.077548E−16 |  |
| 4 | −1.241459E−06 | 5.374001E−10 | 3.807703E−13 | −1.113148E−16 |  |  |
| 6 | 8.249068E−11 | −8.376686E−14 | 1.088675E−16 |  |  |  |
| 8 | 2.478662E−14 | 4.578180E−17 |  |  |  |  |
| 10 | 2.516691E−18 |  |  |  |  |  |

TABLE 4

S4

| i | 0 | 2 | 4 | 6 | 8 | 10 |
|---|---|---|---|---|---|----|
| 0 |  | −3.486188E−03 | −5.220196E−07 | −7.711974E−11 | −5.495363E−13 | 2.301613E−16 |
| 2 | 3.881355E−03 | −6.274297E−07 | 1.498138E−11 | 3.435953E−15 | −3.214151E−17 |  |
| 4 | −8.318319E−07 | 1.215514E−10 | 2.257107E−13 | 3.660804E−17 |  |  |
| 6 | 6.773887E−11 | −6.187276E−15 | −6.780104E−17 |  |  |  |
| 8 | 2.232790E−14 | 8.671107E−17 |  |  |  |  |
| 10 | −1.119989E−17 |  |  |  |  |  |

(Mounted Optical System)
Projection-lens focal length (mm): 46.600 (telephoto side) to 23.300 (wide-angle side)
Display device (mm×mm): 14.5152×8.1648

Example 2

| Si | d | nd | νd |
|----|---|----|----|
| 1 | 7.000 | 1.49473 | 57.49 |
| 2 | 16.158 to 15.998 |  |  |

-continued

| Si | d | nd | νd |
|----|---|----|----|
| 3 | 21.203 | 1.49473 | 57.49 |
| 4 | 32.726 |  |  |

Projection-Lens First Surface
(Free Curved Surface Data)

TABLE 5

S1

| i | 0 | 2 | 4 | 6 | 8 | 10 |
|---|---|---|---|---|---|----|
| 0 |  | −1.933302E−03 | −1.117856E−07 | −1.177181E−10 | 8.221467E−14 | 2.225788E−17 |
| 2 | 1.202695E−03 | 3.961666E−07 | −2.525743E−11 | −4.810689E−14 | 1.929285E−17 |  |
| 4 | −2.433002E−07 | −7.105531E−11 | 1.595327E−13 | 1.990193E−17 |  |  |
| 6 | 8.251572E−11 | −5.241358E−15 | −8.233382E−17 |  |  |  |
| 8 | −1.809804E−14 | 3.211284E−17 |  |  |  |  |
| 10 | −4.837119E−19 |  |  |  |  |  |

TABLE 6

S2

| i | 0 | 2 | 4 | 6 | 8 | 10 |
|---|---|---|---|---|---|----|
| 0 |  | 1.252159E−02 | 3.464907E−07 | 7.374223E−10 | 1.229071E−13 | 8.233313E−17 |
| 2 | 3.887520E−03 | −2.574328E−07 | 1.036757E−09 | 2.263457E−13 | 2.487484E−16 |  |
| 4 | −7.374398E−07 | 1.217818E−10 | −2.750970E−13 | 9.063870E−17 |  |  |
| 6 | 1.905983E−10 | −2.106994E−13 | 8.155000E−17 |  |  |  |
| 8 | −1.015688E−14 | 1.240118E−16 |  |  |  |  |
| 10 | 5.172677E−18 |  |  |  |  |  |

TABLE 7

S3

| i | 0 | 2 | 4 | 6 | 8 | 10 |
|---|---|---|---|---|---|---|
| 0 |  | 7.103753E−03 | −6.817578E−07 | 2.926628E−10 | −1.093076E−13 | −3.634102E−16 |
| 2 | 5.247594E−03 | −1.260613E−06 | 4.602380E−10 | 1.609431E−14 | 2.420992E−16 |  |
| 4 | −7.619402E−07 | 6.307753E−10 | 3.100861E−13 | −3.231518E−16 |  |  |
| 6 | 2.790748E−10 | −9.596082E−13 | −2.991517E−16 |  |  |  |
| 8 | 3.847185E−14 | 2.428876E−16 |  |  |  |  |
| 10 | 5.670353E−17 |  |  |  |  |  |

TABLE 8

S4

| i | 0 | 2 | 4 | 6 | 8 | 10 |
|---|---|---|---|---|---|---|
| 0 |  | −4.265163E−03 | −1.012260E−06 | −1.062535E−10 | −5.866742E−13 | 1.984214E−16 |
| 2 | 2.787663E−03 | −1.023384E−06 | −2.281568E−10 | 1.004766E−13 | −7.486689E−18 |  |
| 4 | −4.523931E−07 | 1.088071E−09 | 4.712355E−13 | −1.671971E−16 |  |  |
| 6 | 3.867857E−10 | −1.982188E−12 | −6.411243E−17 |  |  |  |
| 8 | 4.520099E−14 | 4.360709E−16 |  |  |  |  |
| 10 | 7.309614E−17 |  |  |  |  |  |

(Mounted Optical System)
Projection-lens focal length (mm): 46.600 (telephoto side) to 23.300 (wide-angle side)
Display device (mm×mm): 14.5152×8.1648

Example 3

| Si | d | nd | vd |
|---|---|---|---|
| 1 | 7.000 | 1.49473 | 57.49 |
| 2 | 10.706 to 12.215 |  |  |

-continued

| Si | d | nd | vd |
|---|---|---|---|
| 3 | 24.142 | 1.49473 | 57.49 |
| 4 | 32.452 |  |  |

Projection-Lens First Surface
(Free Curved Surface Data)

TABLE 9

S1

| i | 0 | 2 | 4 | 6 | 8 | 10 |
|---|---|---|---|---|---|---|
| 0 |  | −1.672277E−03 | −1.339500E−07 | −3.128392E−10 | 5.707404E−14 | 1.846124E−17 |
| 2 | 6.260497E−04 | 6.590616E−07 | −2.435556E−10 | 4.814529E−16 | 4.058610E−18 |  |
| 4 | 5.934609E−08 | −1.916708E−10 | 1.158579E−13 | −4.387451E−18 |  |  |
| 6 | 3.023724E−11 | 5.315869E−14 | 1.794467E−18 |  |  |  |
| 8 | 5.866402E−15 | −1.844336E−17 |  |  |  |  |
| 10 | 7.814252E−19 |  |  |  |  |  |

TABLE 10

S2

| i | 0 | 2 | 4 | 6 | 8 | 10 |
|---|---|---|---|---|---|---|
| 0 |  | 1.400587E−02 | 3.559274E−07 | −3.594195E−11 | −3.047024E−13 | 4.006044E−17 |
| 2 | 4.256755E−03 | −1.078169E−06 | 8.279398E−10 | −2.573213E−13 | 2.108103E−16 |  |
| 4 | −8.737932E−07 | 4.747596E−10 | −1.177521E−14 | 2.057186E−16 |  |  |
| 6 | 2.229773E−10 | −1.044879E−13 | 2.783634E−16 |  |  |  |
| 8 | −1.706519E−14 | 4.007891E−17 |  |  |  |  |
| 10 | 1.226626E−17 |  |  |  |  |  |

TABLE 11

S3

| i | 0 | 2 | 4 | 6 | 8 | 10 |
|---|---|---|---|---|---|---|
| 0 |  | 9.882305E−03 | −4.498242E−07 | 3.106319E−10 | −2.984861E−14 | −3.019404E−16 |
| 2 | 5.938837E−03 | −2.088254E−06 | 4.146254E−10 | 2.929266E−14 | 1.833154E−16 |  |
| 4 | −1.217972E−06 | 4.239305E−10 | 4.554651E−13 | −9.402422E−17 |  |  |
| 6 | 8.928018E−11 | −1.603468E−13 | 8.068224E−17 |  |  |  |
| 8 | 2.181745E−14 | 1.195738E−16 |  |  |  |  |
| 10 | −5.577950E−18 |  |  |  |  |  |

TABLE 12

S4

| i | 0 | 2 | 4 | 6 | 8 | 10 |
|---|---|---|---|---|---|---|
| 0 |  | −3.234539E−03 | −9.596634E−07 | 5.106466E−10 | −6.254351E−13 | 1.427549E−16 |
| 2 | 2.553655E−03 | −8.972771E−07 | −6.546994E−11 | 7.900531E−14 | 4.729782E−17 |  |
| 4 | −5.475899E−07 | 1.958361E−10 | 3.901724E−13 | 1.703219E−16 |  |  |
| 6 | 3.190232E−11 | −2.408876E−13 | −3.713462E−16 |  |  |  |
| 8 | −5.024936E−15 | 2.873828E−16 |  |  |  |  |
| 10 | −3.595249E−17 |  |  |  |  |  |

(Mounted Optical System)
Projection-lens focal length (mm): 46.600 (telephoto side) to 23.300 (wide-angle side)
Display device (mm×mm): 14.5152×8.1648

Example 4

| Si | d | nd | vd |
|---|---|---|---|
| 1 | 4.000 | 1.49473 | 57.49 |
| 2 | 8.614 |  |  |
| 3 | 4.000 | 1.49473 | 57.49 |
| 4 | 6.597 to 6.286 |  |  |
| 5 | 13.500 | 1.49473 | 57.49 |
| 6 | 15.681 |  |  |

Projection-Lens First Surface
(Free Curved Surface Data)

TABLE 13

S1, S3

| i | 0 | 2 | 4 | 6 | 8 | 10 |
|---|---|---|---|---|---|---|
| 0 |  | −2.356881E−03 | 1.807559E−06 | −1.587371E−09 | 9.974427E−13 | −5.962668E−16 |
| 2 | 6.349380E−05 | 3.677258E−06 | −2.481875E−09 | 1.709176E−12 | −1.215216E−15 |  |
| 4 | 5.196552E−07 | 2.686351E−10 | −1.514383E−12 | 8.416018E−16 |  |  |
| 6 | 1.406579E−09 | −2.635701E−12 | 1.058775E−15 |  |  |  |
| 8 | −6.810589E−13 | 7.810172E−16 |  |  |  |  |
| 10 | 4.133716E−17 |  |  |  |  |  |

TABLE 14

S2, S4

| i | 0 | 2 | 4 | 6 | 8 | 10 |
|---|---|---|---|---|---|---|
| 0 |  | 8.891456E−03 | −1.076302E−06 | −1.950396E−09 | 6.222817E−12 | −5.537902E−15 |
| 2 | 2.475331E−03 | −2.285093E−06 | 6.774699E−09 | −2.888118E−12 | −2.524606E−15 |  |
| 4 | −8.214859E−07 | 8.073695E−09 | −1.295350E−11 | 5.470221E−15 |  |  |
| 6 | 3.244818E−09 | −8.098430E−12 | 4.776882E−15 |  |  |  |
| 8 | −1.447584E−12 | 1.920134E−15 |  |  |  |  |
| 10 | 6.743182E−17 |  |  |  |  |  |

TABLE 15

S5

| | | | j | | | |
|---|---|---|---|---|---|---|
| i | 0 | 2 | 4 | 6 | 8 | 10 |
| 0 |  | 1.614659E−02 | −4.253173E−06 | −4.057286E−09 | 1.249979E−11 | −3.688257E−15 |
| 2 | 1.074673E−02 | −1.391280E−05 | 1.634576E−08 | −7.223406E−12 | 2.407385E−15 | |
| 4 | −3.645744E−06 | 2.062071E−08 | −1.832160E−11 | 1.264633E−14 | | |
| 6 | 7.533417E−09 | −1.734533E−11 | 1.060333E−14 | | | |
| 8 | −4.661802E−12 | 6.069414E−15 | | | | |
| 10 | 1.106937E−15 | | | | | |

TABLE 16

S6

| | | | j | | | |
|---|---|---|---|---|---|---|
| i | 0 | 2 | 4 | 6 | 8 | 10 |
| 0 |  | −2.245678E−03 | 8.785822E−07 | −5.676172E−09 | 1.136955E−11 | −2.246672E−15 |
| 2 | 6.476960E−03 | −5.152622E−06 | 4.483517E−09 | −5.484607E−13 | 1.760227E−15 | |
| 4 | −1.613193E−06 | 1.125622E−08 | −2.823104E−12 | 3.741016E−15 | | |
| 6 | 6.440421E−09 | −1.568654E−11 | 7.287904E−15 | | | |
| 8 | −6.942138E−12 | 1.017520E−14 | | | | |
| 10 | 3.353313E−15 | | | | | |

(Mounted Optical System 1)
Projection-lens focal length (mm): 46.600 (telephoto side) to 23.300 (wide-angle side)
Display device (mm×mm): 14.5152×8.1648
(Mounted Optical System 2)
Projection-lens focal length (mm): 66.750 (telephoto side) to 44.500 (wide-angle side)
Display device (mm×mm): 20.736×11.664
(Mounted Optical System 3)
Projection-lens focal length (mm): 44.500 (telephoto side) to 30.700 (wide-angle side)
Display device (mm×mm): 20.736×11.664

Example 5

| Si | d | nd | vd |
|---|---|---|---|
| 1 | 4.000 | 1.49473 | 57.49 |
| 2 | 9.031 | | |

-continued

| Si | d | nd | vd |
|---|---|---|---|
| 3 | 4.000 | 1.49473 | 57.49 |
| 4 | 5.853 to 5.595 | | |
| 5 | 10.021 | 1.49473 | 57.49 |
| 6 | 0.458 | | |
| 7 | 10.021 | 1.49473 | 57.49 |
| 8 | 14.597 | | |

Projection-Lens First Surface (Free Curved Surface Data)

TABLE 17

S1, S3

| | | | j | | | |
|---|---|---|---|---|---|---|
| i | 0 | 2 | 4 | 6 | 8 | 10 |
| 0 |  | −3.530748E−03 | 1.425678E−06 | −1.205345E−09 | 9.461245E−13 | −6.348835E−16 |
| 2 | −4.931908E−04 | 3.964485E−06 | −1.530756E−09 | 4.788716E−13 | −8.312019E−16 | |
| 4 | 4.566714E−07 | −8.625157E−10 | 5.634712E−14 | 1.923639E−16 | | |
| 6 | 1.065552E−09 | −2.206920E−12 | 7.854726E−16 | | | |
| 8 | −5.552125E−13 | 7.765458E−16 | | | | |
| 10 | 4.398808E−17 | | | | | |

TABLE 18

S2, S4

| i | j=0 | j=2 | j=4 | j=6 | j=8 | j=10 |
|---|---|---|---|---|---|---|
| 0 |  | 6.614460E−03 | −3.661180E−07 | −2.511431E−09 | 6.258377E−12 | −4.983491E−15 |
| 2 | 1.652712E−03 | −1.674642E−06 | 7.490583E−09 | −1.849145E−12 | −3.663227E−15 |  |
| 4 | −1.055380E−06 | 7.144169E−09 | −1.109697E−11 | 4.346210E−15 |  |  |
| 6 | 3.068445E−09 | −8.384216E−12 | 4.636645E−15 |  |  |  |
| 8 | −1.411460E−12 | 2.322459E−15 |  |  |  |  |
| 10 | 1.150492E−16 |  |  |  |  |  |

TABLE 19

S5, S7

| i | j=0 | j=2 | j=4 | j=6 | j=8 | j=10 |
|---|---|---|---|---|---|---|
| 0 |  | 1.025555E−02 | 3.455135E−07 | −4.258943E−09 | 1.453124E−11 | −5.727138E−15 |
| 2 | 7.087391E−03 | −1.136480E−05 | 1.206093E−08 | 1.501857E−12 | −1.770878E−16 |  |
| 4 | −4.498568E−06 | 2.066895E−08 | −1.694820E−11 | 4.616795E−15 |  |  |
| 6 | 8.031849E−09 | −1.901812E−11 | 6.296260E−15 |  |  |  |
| 8 | −4.496889E−12 | 6.571761E−15 |  |  |  |  |
| 10 | 7.174539E−16 |  |  |  |  |  |

TABLE 20

S6, S8

| i | j=0 | j=2 | j=4 | j=6 | j=8 | j=10 |
|---|---|---|---|---|---|---|
| 0 |  | 1.906804E−03 | 1.895986E−06 | −4.136317E−09 | 1.391803E−11 | −3.894713E−15 |
| 2 | 5.136653E−03 | −7.257366E−06 | 5.767525E−09 | 4.354951E−12 | 2.017135E−15 |  |
| 4 | −3.481275E−06 | 1.663717E−08 | −1.008839E−11 | 1.422484E−15 |  |  |
| 6 | 7.832034E−09 | −1.890671E−11 | 4.319780E−15 |  |  |  |
| 8 | −5.621151E−12 | 8.435191E−15 |  |  |  |  |
| 10 | 1.326303E−15 |  |  |  |  |  |

(Mounted Optical System 1)
Projection-lens focal length (mm): 46.600 (telephoto side) to 23.300 (wide-angle side)
Display device (mm×mm): 14.5152×8.1648
(Mounted Optical System 2)
Projection-lens focal length (mm): 66.750 (telephoto side) to 44.500 (wide-angle side)
Display device (mm×mm): 20.736×11.664
(Mounted Optical System 3)
Projection-lens focal length (mm): 44.500 (telephoto side) to 30.700 (wide-angle side)
Display device (mm×mm): 20.736×11.664

Example 6

| Si | d | nd | vd |
|---|---|---|---|
| 1 | 8.000 | 1.49473 | 57.49 |
| 2 | 16.713 |  |  |
| 3 | 8.000 | 1.49473 | 57.49 |
| 4 | 14.617 |  |  |
| 5 | 22.335 | 1.49473 | 57.49 |
| 6 | 12.933 |  |  |
| 7 | 8.000 | 1.49473 | 57.49 |
| 8 | 16.713 |  |  |
| 9 | 8.000 | 1.49473 | 57.49 |
| 10 | 14.617 to 13.724 |  |  |
| 11 | 22.335 | 1.49473 | 57.49 |
| 12 | 12.135 |  |  |

Projection-Lens First Surface
(Free Curved Surface Data)

TABLE 21

S1, S3, S7, S9

| i | 0 | 2 | 4 | 6 | 8 | 10 |
|---|---|---|---|---|---|----|
| 0 |  | 2.229880E−03 | −2.152773E−06 | 1.523951E−09 | −3.357770E−13 | −3.918257E−18 |
| 2 | 5.157195E−05 | 3.772447E−07 | −5.710636E−11 | 1.396794E−14 | −5.495264E−18 |  |
| 4 | 4.134845E−08 | 5.273098E−12 | −6.910558E−15 | 2.513938E−18 |  |  |
| 6 | 3.737430E−11 | −2.004894E−14 | 2.676607E−18 |  |  |  |
| 8 | −5.631483E−15 | 1.576697E−18 |  |  |  |  |
| 10 | 8.504008E−20 |  |  |  |  |  |

TABLE 22

S2, S4, S8, S10

| i | 0 | 2 | 4 | 6 | 8 | 10 |
|---|---|---|---|---|---|----|
| 0 |  | 9.060652E−03 | −2.722586E−06 | 1.707552E−09 | 1.378187E−13 | −2.215509E−16 |
| 2 | 1.065157E−03 | −3.260087E−07 | 2.495853E−10 | −2.140629E−14 | −7.225207E−18 |  |
| 4 | −1.076029E−07 | 2.672362E−10 | −9.701452E−14 | 1.683071E−17 |  |  |
| 6 | 8.978975E−11 | −6.461690E−14 | 9.153619E−18 |  |  |  |
| 8 | −1.158794E−14 | 3.613933E−18 |  |  |  |  |
| 10 | 1.405042E−19 |  |  |  |  |  |

TABLE 23

S5, S11

| i | 0 | 2 | 4 | 6 | 8 | 10 |
|---|---|---|---|---|---|----|
| 0 |  | 1.102718E−02 | −4.068691E−07 | −1.184270E−10 | 3.768421E−14 | −1.642180E−17 |
| 2 | 5.185555E−03 | −1.648851E−06 | 5.318339E−10 | −6.707450E−14 | 7.438953E−19 |  |
| 4 | −4.460290E−07 | 6.798581E−10 | −1.400255E−13 | 2.361346E−17 |  |  |
| 6 | 2.374688E−10 | −1.358929E−13 | 2.013484E−17 |  |  |  |
| 8 | −3.662116E−14 | 1.158462E−17 |  |  |  |  |
| 10 | 2.062915E−18 |  |  |  |  |  |

TABLE 24

S6, S12

| i | 0 | 2 | 4 | 6 | 8 | 10 |
|---|---|---|---|---|---|----|
| 0 |  | 2.667102E−04 | 3.410407E−07 | −9.095976E−10 | 1.336901E−13 | −2.720503E−18 |
| 2 | 3.399886E−03 | −7.177050E−07 | 1.264009E−10 | −1.879249E−15 | 1.155237E−18 |  |
| 4 | −2.409701E−07 | 3.259864E−10 | −2.232663E−14 | 8.583463E−18 |  |  |
| 6 | 1.983988E−10 | −1.221094E−13 | 1.470754E−17 |  |  |  |
| 8 | −5.410320E−14 | 2.004746E−17 |  |  |  |  |
| 10 | 6.603190E−18 |  |  |  |  |  |

(Mounted Optical System)
Projection-lens focal length (mm): 46.600 (telephoto side) to 23.300 (wide-angle side)
Display device (mm×mm): 7.7414×5.8061

FIGS. 21 to 30 show a distortion view of the projected area in the image projection system in the examples 1 to 6. In more detail, FIGS. 21 to 23 show distortion views of the projected area on the wide-angle side and on the telephoto side in the examples 1 to 3, respectively. FIGS. 24 to 26 respectively show distortion views of the projected area on the wide-angle side and on the telephoto side when the mounted optical systems 1 to 3 are used in the examples 4. FIGS. 27 to 29 respectively show distortion views on the wide-angle side and on the telephoto side when the mounted optical systems 1 to 3 are used in the example 5. FIG. 30 shows a distortion view on the wide-angle side and a distortion view on the telephoto side of the projected area in the example 6. Here, as the projection lens 2, an ideal lens is not used but a specific lens is used, and the distortion views shown are distortion views in the time the image displayed on the display device 1 is projected to the projected surface (the screen SC) with the upper end or the lower end of the display surface of the display device 1 substantially aligned with the optical axes of the projection lens 2 and the anamorphic converter 3.

In each figure, the numbers of the examples, the wide-angle side (w) or the telephoto side (t), the numbers of the mounted optical systems (only FIGS. 4 and 5) also are indicated. For example, the "example 4w1" means a distortion view on the wide-angle side in the time the mounted optical system 1 is used in the example 4. Each rectangular-shaped lattice (it may be regarded as an intersection point of a longitudinal line and a transverse line) in each distortion view corresponds to each pixel of the display surface of the display device 1.

As shown in these figures, it is seen that in the examples 1 to 6, it is possible to well correct distortions of the projected area in both main magnification direction and sub-magnification direction; especially, a distortion on the wide-angle side of the projected area is well corrected.

Besides, tables 25 and 26 represent values in the conditional expressions described above. In the table 25, the "projection distance" does not mean the distance from the anamorphic converter 3 to the screen SC but the distance (mm) from the projection lens 2 to the screen SC. It is understood from these tables that all the examples 1 to 6 meet the various conditional expressions described above.

TABLE 25

|  |  | Example 1 | Example 2 | Example 3 | Example 4 | | |
|---|---|---|---|---|---|---|---|
| Magnification ratio (a) in main magnification direction | | 1.32 | 1.19 | 1.25 | 1.32 | | |
| Magnification ratio (b) in sub-magnification direction | | 1.00 | 0.90 | 1.00 | 1.00 | | |
| a/b | | 1.32 | 1.32 | 1.25 | 1.32 | | |
|  |  |  |  |  | Optical system 1 | Optical system 2 | Optical system 3 |
| Wide-angle side | Projection distance (lens to screen) | 4200.00 | 4200.00 | 4200.00 | 4200.00 | 5638.77 | 3879.24 |
|  | Hcorner | 3550.96 | 3575.20 | 3371.04 | 3569.98 | 3550.44 | 3592.42 |
|  | $H_0$ | 3557.24 | 3581.70 | 3352.48 | 3566.80 | 3551.70 | 3584.28 |
|  | $\Delta H$ | −0.0018 | −0.0018 | 0.0055 | 0.0009 | −0.0004 | 0.0023 |
|  | Vcorner | 1511.10 | 1534.33 | 1515.60 | 1516.92 | 1511.40 | 1524.67 |
|  | $V_0$ | 1485.29 | 1490.46 | 1485.63 | 1490.86 | 1498.04 | 1491.54 |
|  | $\Delta V$ | 0.0174 | 0.0294 | 0.0202 | 0.0175 | 0.0089 | 0.0222 |
|  | $\Delta H/\Delta V$ | −0.10 | −0.06 | 0.27 | 0.05 | −0.04 | 0.10 |
| Telephoto side | Projection distance (lens to screen) | 8484.20 | 8484.20 | 8484.20 | 8484.20 | 8489.60 | 5647.17 |
|  | Hcorner | 3531.60 | 3530.80 | 3326.28 | 3533.32 | 3511.36 | 3541.06 |
|  | $H_0$ | 3532.20 | 3529.98 | 3324.38 | 3536.60 | 3526.90 | 3545.56 |
|  | $\Delta H$ | −0.0002 | 0.0002 | 0.0006 | −0.0009 | −0.0044 | −0.0013 |
|  | Vcorner | 1498.78 | 1498.20 | 1493.22 | 1500.84 | 1491.20 | 1507.05 |
|  | $V_0$ | 1492.93 | 1491.03 | 1487.05 | 1494.74 | 1489.01 | 1494.53 |
|  | $\Delta V$ | 0.0039 | 0.0048 | 0.0041 | 0.0041 | 0.0015 | 0.0084 |
|  | $\Delta H/\Delta V$ | −0.04 | 0.05 | 0.14 | −0.23 | −3.00 | −0.15 |
|  |  | Example 5 | | | Example 6 | | |
| Magnification ratio (a) in main magnification direction | | 1.32 | | | 1.75 | | |
| Magnification ratio (b) in sub-magnification direction | | 1.00 | | | 1.00 | | |
| a/b | | 1.32 | | | 1.75 | | |
|  |  | Optical system 1 | Optical system 2 | Optical system 3 | | | |
| Wide-angle side | Projection distance (lens to screen) | 4200.00 | 5638.77 | 3879.24 | 4200.00 | | |
|  | Hcorner | 3580.28 | 3534.18 | 3612.74 | 2555.94 | | |
|  | $H_0$ | 3569.16 | 3529.06 | 3597.02 | 2542.40 | | |
|  | $\Delta H$ | 0.0031 | 0.0015 | 0.0044 | 0.0053 | | |
|  | Vcorner | 1523.31 | 1511.19 | 1532.15 | 1096.17 | | |
|  | $V_0$ | 1489.08 | 1493.96 | 1491.26 | 1071.37 | | |
|  | $\Delta V$ | 0.0230 | 0.0115 | 0.0274 | 0.0231 | | |
|  | $\Delta H/\Delta V$ | 0.14 | 0.13 | 0.16 | 0.23 | | |
| Telephoto side | Projection distance (lens to screen) | 8484.20 | 8489.60 | 5647.17 | 8484.20 | | |
|  | Hcorner | 3495.92 | 3474.26 | 3523.52 | 2521.54 | | |
|  | $H_0$ | 3500.02 | 3489.96 | 3522.24 | 2523.90 | | |
|  | $\Delta H$ | −0.0012 | −0.0045 | 0.0004 | −0.0009 | | |
|  | Vcorner | 1497.07 | 1487.68 | 1506.77 | 1072.72 | | |
|  | $V_0$ | 1491.77 | 1486.36 | 1490.68 | 1069.43 | | |
|  | $\Delta V$ | 0.0036 | 0.0009 | 0.0108 | 0.0031 | | |
|  | $\Delta H/\Delta V$ | −0.33 | −5.07 | 0.03 | −0.30 | | |

TABLE 26

| C(2, 0)/c(0, 2) | Example 1 | Example 2 | Example 3 | Example 4 | Example 5 | Example 6 |
|---|---|---|---|---|---|---|
| First-group last surface | 0.358 | 0.310 | 0.304 | 0.278 | 0.250 | 0.118 |
| Second-group first surface | 0.957 | 0.739 | 0.601 | 0.666 | 0.691 | 0.470 |

The example 1 to 6 described above are so structured as to meet the following conditions below:
(i) The free curved surface has a shape in which there is a symmetric axis (the y axis) with respect to the main magnification direction and there is a symmetric axis (the z axis) with respect to the sub-magnification axis.
(ii) The intersection points (the intersection points of the y axis and the z axis) of the symmetric axes of the free curved surfaces of the anamorphic converter 3 are present on the same straight line.
(iii) The optical axis of the anamorphic converter 3 and the optical axis of the projection lens 2 are parallel with each other. Here, if the anamorphic converter 3 includes lens elements that have a point-symmetric shape, the optical axis of the anamorphic converter 3 means a straight line that connects symmetric axes of the lens elements, and if the anamorphic converter 3 includes lens elements that have only a free curved surface, the optical axis of the anamorphic converter 3 means a straight line that connects the intersection points of symmetric axes of the free curved surfaces.

The optical axis of the anamorphic converter 3 may not be necessarily parallel with the optical axis of the projection lens 2 and may be suitably inclined toward the optical axis of the projection lens 2; however, if both optical axes are parallel with each other as in the above condition (iii), the anamorphic converter 3 is able to be disposed near the projection lens 2 and it becomes possible to reduce the size of the anamorphic converter 3. In other words, if the anamorphic converter 3 is inclined toward the projection lens 2, the disposition space for the anamorphic converter 3 becomes large and there is a concern that the anamorphic converter 3 becomes large; however, it is possible to avoid this concern according to the structure in the condition (iii).

As described above, the anamorphic converter according to the present invention includes, in order from a projected-surface side: a first group having one or more lens elements and a negative power at least in a main magnification direction and a second group having one or more lens elements and a positive power at least in the main magnification direction, projects an image at magnification ratios that are different from each other in the main magnification direction and the sub-magnification direction, wherein of optical surfaces, a last surface of the first group and a first surface of the second group have: [1] positive power in both main magnification and sub-magnification directions; [2] are convex toward the projected-surface side in both main magnification and sub-magnification directions in a region having an area that is ¼ or more of an optical effective region area including a center portion of each of the last and first optical surface; and [3] at least one of the last and first optical surfaces is a free curved surface.

The first-group last surface and the second-group first surface meet the foregoing conditions [1], [2], and [3], so that distortion aberration (a distortion of a projected area) is able to be dramatically reduced compared with the conventional anamorphic converter, while maintaining excellent image-forming performance. Besides, the effect of reducing distortion aberration becomes large by defining especially the first-group last surface and the second-group first surface of the optical surfaces as described above. Because of the dramatic reduction in distortion aberration, it becomes possible to project an image with less distortion without using an expensive curved screen.

It is desirable that the anamorphic converter according to the present invention includes at least one set of optical surfaces that have the same shape.

It is desirable that in the anamorphic converter according to the present invention, at least one of the first group and the second group is composed of two or more lens elements.

The anamorphic converter according to the present invention may be so structured that the anamorphic converter further includes a third group that has one or more lens elements and a negative power at least in the main magnification direction; and a fourth group that has one or more lens elements and a positive power at least in the main magnification direction, wherein the four groups of the first group to the fourth group are disposed in order from the projected-surface side.

It is desirable that the anamorphic converter according to the present invention includes at least one set of the same lens elements.

It is desirable that in the anamorphic converter according to the present invention, at least one of the sets of the first group and the third group, and the second group and the fourth group has the same group structure.

It is desirable that when the magnification ratio in the main magnification direction is a and the magnification ratio in the sub-magnification direction is b, the anamorphic converter meets the following conditions:

$$1.2 \leq a/b \leq 2.0 \text{ and } 0.8 \leq b \leq 1.1$$

It is desirable that the anamorphic converter further meets the following condition:

$$0.9 \leq b \leq 1.0$$

It is desirable that if the last surface of the first group of the anamorphic converter is a free curved surface and the shape of the free curved surface is represented by the following numerical expression, the following condition is met:

$$0 < c(2, 0)/c(0, 2) \leq 0.4$$

$$x = \frac{ch^2}{1 + \sqrt{1 - (1+k)c^2h^2}} + \sum\sum c(i, j)y^i z^j$$

where
x: the displacement amount in the optical-axis direction at a height h.
h: the height in a direction perpendicular to the optical axis.
c: the paraxial curvature.
k: the conic coefficient.
c (i, j): the free curved surface coefficient at the i degree of y and the j degree of z.

It is desirable that if the first surface of the second group of the anamorphic converter is a free curved surface and the shape of the free curved surface is represented by the following numerical expression, the following condition is met:

$$0 < c(2, 0)/c(0, 2) \leq 1.0$$

$$x = \frac{ch^2}{1 + \sqrt{1 - (1+k)c^2h^2}} + \sum\sum c(i, j)y^i z^j$$

where
x: the displacement amount in the optical-axis direction at a height h.
h: the height in a direction perpendicular to the optical axis.
c: the paraxial curvature.
k: the conic coefficient.
c (i, j): the free curved surface coefficient at the i degree of y and the j degree of z, It is desirable that in the anamorphic converters according to the present invention, at least one distance between the group that has a negative power at least in the main magnification direction and the group which has an ordinal number higher by only 1 than the group having the negative power is able to be varied according to a projection condition.

In the anamorphic converter according to the present invention, the optical system that includes the third group and the fourth group may function as an anamorphic converter, and the optical system that includes the first group and the second group and the optical system that includes the third group and the fourth group may be separable from each other.

In the anamorphic converter according to the present invention, the optical system that includes the third group and the fourth group may function as an anamorphic converter, and the optical system that includes the first group and the second group and the optical system that includes the third group and the fourth group may be arranged rotatably relatively with each other It is desirable that in the anamorphic converter according to the present invention, the lens elements disposed in the groups from the first group to the last group are formed of a resin material.

The image projection system according to the present invention includes a display device, a projection lens that projects an image displayed on the display device onto a projected surface, and an anamorphic converter that is disposed near the projected-surface side with respect to the projection lens, wherein the anamorphic converter is composed of the anamorphic converter according to the present invention.

It is desirable that the image projection system according to the present invention meets the following conditional expressions when an image displayed on the display device is projected to a projected surface with the upper end or the lower end of the display surface of the display device substantially aligned with the optical axis of the projection lens:

when $\Delta V \neq 0$ $(\Delta H/\Delta V) < 0.275$ and $-0.01 < \Delta H < +0.01$ when $\Delta V = 0$, $-0.01 < \Delta H < +0.01$ where $\Delta H = (H\text{corner}/H_0) - 1$ $\Delta V = (V\text{corner}/V_0) - 1$ Hcorner: the length (mm) between the corners of a projected area in the main magnification direction.
$H_0$: the length (mm) of the projected area along the line which runs through the center of the projected area in the main magnification direction.
Vcorner: the length (mm) between the corners of the projected area in the sub-magnification direction.
$V_0$: the length (mm) of the projected area along the line which runs though the center of the projected area in the sub-magnification direction In the image projection system according to the present invention, the optical axis of the anamorphic converter and the optical axis of the projection lens may be parallel with each other.

The present invention is applicable to systems that dispose an anamorphic converter in front of a projection lens and projects an image.

It is apparent from the above description that various modifications and variations are able to be made to the present invention. Accordingly, it is understood that the present invention is put into practical use within the scope of the attached claims without being limited to the specific description.

What is claimed is:

1. An anamorphic converter that projects an image at magnification ratios that are different from each other in a main magnification direction and a sub-magnification direction, comprising, in order from a projected-surface side:
   a first group having one or more lens elements and a negative power at least in the main magnification direction; and
   a second group having one or more lens elements and a positive power at least in the main magnification direction,
   wherein of optical surfaces, a last surface of the first group and a first surface of the second group:
   [1] have a power in both main magnification and sub-magnification directions;
   [2] are convex toward the projected-surface side in both main magnification and sub-magnification directions in a region having an area that is ¼ or more of an optical effective region area including a center portion of each of the last and first optical surfaces; and
   [3] at least one of the last and first optical surfaces is a free curved surface.

2. The anamorphic converter according to claim 1, further comprising at least one set of optical surfaces that have the same shape.

3. The anamorphic converter according to claim 1, wherein at least one of the first group and the second group is composed of two or more lens elements.

4. The anamorphic converter according to claim 1, further comprising:
   a third group that has one or more lens elements and a negative power at least in the main magnification direction; and
   a fourth group that has one or more lens elements and a positive power at least in the main magnification direction,
   wherein the four groups of the first group to the fourth group are disposed in order from the projected-surface side.

5. The anamorphic converter according to claim 4, wherein at least one of the sets of the first group and the third group, and the second group and the fourth group has the same group structure.

6. The anamorphic converter according to claim 4, wherein the optical system that includes the third group and the fourth group functions as an anamorphic converter, and the optical system that includes the first group and the second group and the optical system that includes the third group and the fourth group are separable from each other.

7. The anamorphic converter according to claim 4, wherein the optical system that includes the third group and the fourth group may function as an anamorphic converter, and the optical system that includes the first group and the second group and the optical system that includes the third group and the fourth group are arranged rotatably relatively with each other.

8. The anamorphic converter according to claim 1, further comprising at least one set of the same lens elements.

9. The anamorphic converter according to claim 1, wherein when the magnification ratio in the main magnification direction is a and the magnification ratio in the sub-magnification direction is b, the following conditions are met:

$1.2 \leq a/b \leq 2.0$ and $0.8 \leq b \leq 1.1$

10. The anamorphic converter according to claim 9, wherein the following condition is further met:

$0.9 \leq b \leq 1.0$.

11. The anamorphic converter according to claim 9, wherein if the last surface of the first group of the anamorphic converter is a free curved surface and the shape of the free curved surface is represented by the following numerical expression, the following condition is met:

$$0 < c(2,0)/c(0,2) \leq 0.4$$

$$x = \frac{ch^2}{1+\sqrt{1-(1+k)c^2h^2}} + \sum\sum c(i,j)y^i z^j$$

where
x: the displacement amount in the optical-axis direction at a height h,
h: the height in a direction perpendicular to the optical axis,
c: the paraxial curvature,
k: the conic coefficient,
c (i, j): the free curved surface coefficient at the i degree of y and the j degree of z.

12. The anamorphic converter according to claim 9, wherein if the first surface of the second group of the anamorphic converter is a free curved surface and the shape of the free curved surface is represented by the following numerical expression, the following condition is met:

$$0 < c(2,0)/c(0,2) \leq 1.0$$

$$x = \frac{ch^2}{1+\sqrt{1-(1+k)c^2h^2}} + \sum\sum c(i,j)y^i z^j$$

where
x: the displacement amount in the optical-axis direction at a height h,
h: the height in a direction perpendicular to the optical axis,
c: the paraxial curvature,
k: the conic coefficient,
c (i, j): the free curved surface coefficient at the i degree of y and the j degree of z.

13. The anamorphic converter according to claim 1, wherein at least one distance between the group that has a negative power at least in the main magnification direction and the group which has an ordinal number higher by only 1 than the group having the negative power is able to be varied according to a projection condition.

14. The anamorphic converter according to claim 1, wherein the lens elements disposed in the groups from the first group to the last group are formed of a resin material.

15. An image projection system, comprising:
a display device;
a projection lens that projects an image displayed on the display device onto a projected area; and
an anamorphic converter that is disposed near the projected-surface side with respect to the projection lens, wherein the anamorphic converter is composed of the anamorphic converter according to claim 1.

16. The image projection system according to claim 15, meeting the following conditional expressions when an image displayed on the display device is projected to a projected surface with the upper end or the lower end of the display surface of the display device substantially aligned with the optical axis of the projection lens:

when $\Delta V \neq 0$, $(\Delta H/\Delta V) < 0.275$ and $-0.01 < \Delta H < +0.01$ when $\Delta V = 0$, $0.01 < \Delta H < +0.01$ where $\Delta H = (H\text{corner}/H_0) - 1$ $\Delta V (V\text{corner}/V_0) - 1$ Hcorner: the length (mm) between the corners of a projected area in the main magnification direction,
$H_0$: the length (mm) of the projected area along the line which runs through the center of the projected area in the main magnification direction,
Vcorner: the length (mm) between the corners of the projected area in the sub-magnification direction,
$V_0$: the length (mm) of the projected area along the line which runs though the center of the projected area in the sub-magnification direction.

17. The image projection system according to claim 15, wherein the optical axis of the anamorphic converter and the optical axis of the projection lens are parallel with each other.

* * * * *

UNITED STATES PATENT AND TRADEMARK OFFICE
CERTIFICATE OF CORRECTION

PATENT NO. : 7,920,331 B2
APPLICATION NO. : 12/473753
DATED : April 5, 2011
INVENTOR(S) : Kazuhiko Inoue and Yasumasa Sawai It is certified that error appears in the above-identified patent and that said Letters Patent is hereby corrected as shown below:

Column 36:
Line 27, claim 16, delete "$\Delta V \int 0,$" and insert -- $\Delta V \neq 0$, --.

Signed and Sealed this
Thirty-first Day of May, 2011

David J. Kappos
*Director of the United States Patent and Trademark Office*